(12) United States Patent
Li et al.

(10) Patent No.: US 11,451,286 B2
(45) Date of Patent: Sep. 20, 2022

(54) COMMUNICATION METHOD AND COMMUNICATIONS DEVICE THEREOF

(71) Applicant: HUAWEI TECHNOLOGIES CO., LTD., Shenzhen (CN)

(72) Inventors: Yan Li, Beijing (CN); Xiaobo Wu, Shanghai (CN); Fangyuan Zhu, Beijing (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 16/824,859

(22) Filed: Mar. 20, 2020

(65) Prior Publication Data

US 2020/0220602 A1 Jul. 9, 2020

Related U.S. Application Data

(63) Continuation of application No. PCT/CN2018/107337, filed on Sep. 25, 2018.

(30) Foreign Application Priority Data

Sep. 30, 2017 (CN) .......................... 201710916010.3

(51) Int. Cl.
*H04W 76/11* (2018.01)
*H04W 80/10* (2009.01)
(Continued)

(52) U.S. Cl.
CPC ........... *H04B 7/0684* (2013.01); *H04B 7/043* (2013.01); *H04W 76/11* (2018.02); *H04W 80/10* (2013.01)

(58) Field of Classification Search
CPC . H04W 25/24; H04W 25/0268; H04W 80/10; H04W 76/11; H04W 24/06;
(Continued)

(56) References Cited

U.S. PATENT DOCUMENTS

2014/0112135 A1 4/2014 Huang et al.
2016/0337905 A1 11/2016 Zhang et al.
(Continued)

FOREIGN PATENT DOCUMENTS

CN 101072116 A 11/2007
CN 101605348 A 12/2009
(Continued)

OTHER PUBLICATIONS

Huawei: "Discussion about Big Data Driven Network Architecture", 3GPP Draft; S2-173192, vol. SA WG2, No. Hangzhou, China; May 15, 2017 May 19, 2017, May 9, 2017, XP051268656, 12 pages.
(Continued)

*Primary Examiner* — Kent Krueger
(74) *Attorney, Agent, or Firm* — Rimon PC

(57) ABSTRACT

This application provides a communication method. The communication method includes: obtaining, by the database network element, training data, where the training data includes service transmission data and network data; sending, by the database network element, the training data to the data analytics network element; and receiving, by the database network element, first information from the data analytics network element, where the first information includes a first feature index list set, a service identifier corresponding to each feature index list in the first feature index list set, and a DNN corresponding to the service identifier.

20 Claims, 15 Drawing Sheets

(51) Int. Cl.
*H04B 7/06* (2006.01)
*H04B 7/0426* (2017.01)

(58) Field of Classification Search
CPC ..... H04W 24/08; H04B 7/0684; H04B 7/043; H04L 43/062
See application file for complete search history.

(56) References Cited

U.S. PATENT DOCUMENTS

| | | | |
|---|---|---|---|
| 2017/0078157 | A1 | 3/2017 | Zhang |
| 2019/0059067 | A1* | 2/2019 | Lee ................ H04W 28/10 |
| 2020/0252900 | A1* | 8/2020 | Kim ................ H04W 36/0022 |

FOREIGN PATENT DOCUMENTS

| | | |
|---|---|---|
| CN | 102158345 A | 8/2011 |
| CN | 105357739 A | 2/2016 |
| CN | 106792563 A | 5/2017 |
| CN | 106921507 A | 7/2017 |
| CN | 107027134 A | 8/2017 |
| IN | 201617027185 A | 8/2016 |
| WO | 2015018213 A1 | 2/2015 |
| WO | 2015188563 A1 | 12/2015 |

OTHER PUBLICATIONS

3rd Generation Partnership Project: "3rd Generation Partnership Project; Technical Specification Group Services and System Aspects; System Architecture for the 5G System; Stage 2 (Release 15)", 3GPP TS 23.501 v1.2.0, vol. 0, Jul. 1, 2017 pp. 1-166, XP055570913.

Huawei et al, "New SID on Data Driven Network Architecture for 5G", SA WG2 Meeting #121, S2-174004, May 15, 2017, Hangzhou, China, total 3 pages.

* cited by examiner

COMMUNICATION METHOD AND COMMUNICATIONS DEVICE THEREOF

CROSS-REFERENCE TO RELATED APPLICATIONS

This application is a continuation of International Application No. PCT/CN2018/107337, filed on Sep. 25, 2018, which claims priority to Chinese Patent Application No. 201710916010.3, filed on Sep. 30, 2017. The disclosures of the aforementioned applications are hereby incorporated by reference in their entireties.

TECHNICAL FIELD

This application relates to the communications field, and more specifically, to a communication method, a database network element, a data analytics network element, a control plane network element, and a user plane network element.

BACKGROUND

In a communications network, intrusion detection, a differentiated service, traffic monitoring, a quality of service (QoS) guarantee, charging management, and the like may be implemented by identifying a service type. With explosive development of multi-user and multi-service scenarios and the like, how to identify the service type in the communications network supporting big data, for example, in a $5^{th}$ generation (5G) communications network, is a problem that needs to be urgently resolved.

SUMMARY

This application provides a communication method, a database network element, a data analytics network element, a control plane network element, and a user plane network element, to identify a service type by using big data analysis technology in a communications network supporting big data.

According to a first aspect, this application provides a communication method. The communication method includes: obtaining, by a database network element, training data, where the training data includes service transmission data and network data; sending, by the database network element, the training data to a data analytics network element; and receiving, by the database network element, first information from the data analytics network element, where the first information includes a first feature index list set, a service identifier corresponding to each feature index list in the first feature index list set, and a data network name (DNN) corresponding to the service identifier.

In the first aspect, the database network element obtains the training data, and sends the training data to the data analytics network element, so that the data analytics network element can perform a subsequent step based on the training data during service type identification.

In addition, during deployment implementation, the database network element may be deployed close to a service server in a distributed manner. Therefore, when the database network element uses a data synchronization technology, a delay caused during obtaining the training data is reduced.

Similarly, during deployment implementation, the distributed database network element may be alternatively deployed close to a control plane network element. Therefore, when the database network element receives the first information from the data analytics network element, a delay caused when the database network element subsequently sends a feature index list set to the control plane network element is reduced.

In a possible design, the database network element may collect the service transmission data from an operator platform, a third-party service server, or a vertical industry management and control center.

In a possible design, the service transmission data collected by the database network element may include an IP 5-tuple, a size of a data packet, a time for the data packet, a service type, service experience, and an extended field. The IP 5-tuple may include an IP address of a terminal, a port on the terminal, an IP address of a service server, a port on the service server, and a transmission protocol.

In a possible design, the database network element may collect the network data in the following manner: The database network element may obtain the network data from a device such as the terminal, an access network, or a core network element.

In a possible design, the core network element that obtains the network data may include at least one of an access and mobility management function (AMF) network element, a session management function (SMF) network element, a user plane function (UPF) network element, a unified data management (UDM) network element, an application function (AF) network element, and a packet flow description function (PFDF) network element.

In a possible design, the network data may include at least one of the IP address of the terminal, a port number of the terminal, a terminal type, terminal location information, a time, a DNN, and a network congestion condition.

The training data includes the network data and the service transmission data, so that the data analytics network element obtains more accurate first information based on the training data, and service type identification accuracy is improved.

In a possible design, after collecting the service data and the network data, the database network element may associate the service data with the network data, to obtain the training data.

A possible implementation in which the database network element obtains the training data includes: After collecting the service data and the network data, the database network element determines, based on the IP 5-tuple and time information in the service data, network data that includes the same IP 5-tuple and time information, and associates the service data with the network data. After the association, the service data and the network data may be stored as the complete training data in the database network element.

In a possible design, after the database network element receives the first information, the database network element may store the first information in the following manner: The database network element may store, by using a service identifier as data index information, a feature index list corresponding to each service identifier and a DNN corresponding to each service identifier.

In another possible design, after the database network element receives the first information, the database network element may store the first information in the following manner: The database network element may store, by using a DNN as data index information, a service identifier corresponding to each DNN and a feature index list corresponding to each service identifier.

With reference to the first aspect, in a first possible implementation, the communication method further includes: sending, by the database network element, the first information to the control plane network element, so that the control plane network element can perform a subsequent step based on the first information during the service type identification.

In a second possible implementation, the first information further includes at least one of the following information corresponding to each feature index list in the first feature index list set: a network slice type, a session and service continuity (SSC) mode, and a packet data unit (PDU) session type.

To be specific, the first information may include the service identifier corresponding to each feature index list, the DNN corresponding to a service type corresponding to each feature index list, and the at least one of the network slice type, the SSC mode, and the PDU session type that correspond to each feature index list.

For the at least one of the network slice type, the SSC mode, and the PDU session type, after the database network element sends the first information to the control plane network element, the control plane network element can determine a more accurate second feature index list set for a user plane network element based on the first information and the network slice type, the SSC mode, and the PDU session type that are supported by the user plane network element, thereby improving accuracy of subsequent service type identification.

In a third possible implementation, the communication method further includes: receiving, by the database network element from the control plane network element, a DNN corresponding to a first session; querying, by the database network element, the first information based on the DNN corresponding to the first session, to obtain second information, where the second information includes a second feature index list set corresponding to the DNN corresponding to the first session and a service identifier corresponding to each feature index list in the second feature index list set; and sending, by the database network element, the second information to the control plane network element.

The database network element obtains the second information from the first information based on a request from the control plane network element, and sends the second information to the control plane network element, so that the control plane network element can perform a subsequent step during the service type identification.

In a fourth possible implementation, the first information further includes at least one of the following information corresponding to each feature index list in the first feature index list set: a network slice type, an SSC mode, and a PDU session type.

In a fifth possible implementation, the communication method further includes: receiving, by the database network element from the control plane network element, at least one of the following information corresponding to the first session: a network slice type, an SSC mode, and a PDU session type; and the querying, by the database network element, the first information based on the DNN corresponding to the first session, to obtain second information includes: querying, by the database network element, the first information based on the DNN corresponding to the first session and the at least one of the information corresponding to the first session, to obtain the second information.

The database network element queries for the second information from the first information based on both the DNN corresponding to the first session and the at least one of the information corresponding to the first session, to improve accuracy of the second information, and improve service identification efficiency.

In a sixth possible implementation, after the sending, by the database network element, the first information to the control plane network element, the communication method further includes: receiving, by the database network element, third information from the user plane network element, where the third information includes a first service identifier set; querying, by the database network element, the first information based on each service identifier in the first service identifier set, to obtain a feature index list corresponding to each service identifier in the first service identifier set; querying, by the database network element, the network data based on the feature index list corresponding to each service identifier in the first service identifier set, to obtain a network data eigenvalue list corresponding to each service identifier in the first service identifier set; and sending, by the database network element, the network data eigenvalue list corresponding to each service identifier in the first service identifier set to the user plane network element.

During deployment implementation, the database network element may be deployed close to the user plane network element in a distributed manner. Therefore, when the database network element provides, based on a request from the user plane network element, the user plane network element with a network data value used for identifying a service type, a delay caused during transmission of the network data value is reduced.

In a seventh possible implementation, the communication method further includes: receiving, by the database network element, the third information from the user plane network element, where the third information includes a network data feature index list; obtaining, by the database network element, a network data value corresponding to a feature index in the network data feature index list, to obtain the network data eigenvalue list; and sending, by the database network element, the network data eigenvalue list to the user plane network element.

During deployment implementation, the database network element may be deployed close to the user plane network element in a distributed manner. Therefore, when the database network element sends a network data eigenvalue to the user plane network element based on a request from the user plane network element, a delay caused during transmission of the network data value can be reduced.

Optionally, the network data feature index list includes no repetitive feature index.

In an eighth possible implementation, the third information further includes at least one of the following information: a time at which the user plane network element receives service transmission data corresponding to the first session, a session identifier of the first session, an identifier of a terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service data corresponding to the first session.

The network data value sent by the database network element to the user plane network element is determined by the database network element based on the at least one of the information, so that accuracy of the network data value can be improved, and the service type identification accuracy is improved.

According to a second aspect, this application provides a communication method. The communication method includes: receiving, by a data analytics network element, training data sent by the database network element, where the training data includes service transmission data and network data determining, by the data analytics network element, first information based on the training data, where the first information includes a first feature index list set, a service identifier corresponding to each feature index list in the first feature index list set, and a DNN corresponding to the service identifier; and sending, by the data analytics network element, the first information to the database network element.

In the second aspect, the data analytics network element obtains, based on the training data, a feature index list used for identifying a service type, so that the service type can be identified based on the feature index list in a subsequent step.

In addition, the training data based on which the data analytics network element obtains the feature index list is received from the database network element, and during deployment implementation, the database network element may be deployed close to a source of the training data in a distributed manner. Therefore, the communication method in the second aspect helps reduce a delay caused when the database network element obtains the training data.

The data analysis network element determines the first information based on both the service transmission data and the network data, to improve service identification accuracy.

In a first possible implementation, the first information further includes at least one of the following information corresponding to each feature index list in the first feature index list set: a network slice type, an SSC mode, and a PDU session type.

The first information further includes the at least one of the information, so that the database network element or a control plane network element can determine, based on the information, a feature index list supported by a user plane network element, to improve accuracy of the feature index list determined for the user plane network element, and improve service type identification accuracy.

According to a third aspect, this application provides a communication method. The communication method includes: receiving, by a control plane network element, first information from a database network element, where the first information includes a first feature index list set, a service identifier corresponding to each feature index list in the first feature index list set, and a DNN corresponding to the service identifier; querying, by the control plane network element, the first information based on a DNN corresponding to a first session, to obtain second information, where the second information includes a second feature index list set and a service identifier corresponding to each feature index list in the second feature index list set; and sending, by the control plane network element, the second information to a user plane network element.

In this communication method, the control plane network element receives the first information from the database network element, and determines a feature index list corresponding to the user plane network element, so that the user plane network element can proceed with a related step during service type identification.

In addition, during deployment implementation, the database network element may be deployed close to the control plane network element in a distributed manner. Therefore, when the control plane network element receives the first information from the database network element, a delay caused during transmission of the first information is reduced.

Optionally, the control plane network element that receives the first information from the database network element may be an SMF network element or a policy control function (PCF) network element.

With reference to the third aspect, in a first possible implementation, the first information further includes at least one of the following information corresponding to each feature index list in the first feature index list set: a network slice type, an SSC mode, and a PDU session type; and the querying, by the control plane network element, the first information based on a DNN corresponding to a first session, to obtain second information includes: querying, by the control plane network element, the first information based on the DNN corresponding to the first session and at least one of a network slice type, an SSC mode, and a PDU session type that correspond to the first session, to obtain the second information.

The control plane network element determines the second information based on both the DNN corresponding to the first session and the at least one of the information corresponding to the first session, to improve accuracy of the second information, and improve service type identification accuracy.

According to a fourth aspect, this application provides a communication method. The communication method includes: sending, by a control plane network element, a DNN corresponding to a first session to a database network element; receiving, by the control plane network element, second information from the database network element, where the second information includes a second feature index list set and a service identifier corresponding to each feature index list in the second feature index list set, and each feature index list in the second feature index list set corresponds to the DNN corresponding to the first session; and sending, by the control plane network element, the second information to a user plane network element.

In the fourth aspect, the control plane network element requests to obtain the second information from the database network element, and sends the second information to the user plane network element, so that the user plane network element can perform a subsequent step based on the second information during service type identification.

In addition, during deployment implementation, the database network element may be deployed close to the control plane network element in a distributed manner. Therefore, when the control plane network element receives the first information from the database network element, a delay caused during transmission of the first information is reduced.

Optionally, the control plane network element that receives the first information from the database network element may be an SMF network element or a PCF network element.

With reference to the fourth aspect, in a first possible implementation, before the receiving, by the control plane network element, second information from the database network element, the communication method further includes: sending, by the control plane network element to the database network element, at least one of the following information corresponding to the first session: a network slice type, an SSC mode, and a PDU session type.

The control plane network element sends both the DNN corresponding to the first session and the at least one of the information corresponding to the first session to the database network element, so that the database network element determines more accurate second information, to improve service type identification accuracy.

According to a fifth aspect, this application provides a communication method. The communication method includes: receiving, by a user plane network element, second information from a control plane network element, where the second information includes a second feature index list set and a service identifier corresponding to each feature index list in the second feature index list set; receiving, by the user plane network element, service transmission data corresponding to a first session; determining, by the user plane network element, a service identifier corresponding to a feature index list that is in the second feature index list set and for which an eigenvalue cannot be obtained based on the service transmission data, to obtain a first service identifier set; sending, by the user plane network element, third information to a database network element, where the third information includes the first service identifier set; and receiving, by the user plane network element from the database network element, a network data eigenvalue list corresponding to each service identifier in the first service identifier set.

In the fifth aspect, the user plane network element requests, from the database network element, a network data value corresponding to a feature index in the feature index list, so that the user plane network element can perform a subsequent step to identify a service type.

In addition, the database network element may be deployed relatively close to the user plane network element. Therefore, when the user plane network element requests the network data value from the database network element, a delay is reduced.

With reference to the fifth aspect, in a first possible implementation, the third information includes at least one of the following information: a time at which a user plane processes and receives the service transmission data corresponding to the first session, a session identifier of the first session, an identifier of a terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service data corresponding to the first session.

The user plane network element sends both the first service identifier set and the at least one of the information to the database network element, so that the database network element can determine the network data value based on the at least one of the information, to improve accuracy of the determined network data value, and improve service type identification accuracy.

According to a sixth aspect, this application provides a communication method. The communication method includes: receiving, by a user plane network element, second information from a control plane network element, where the second information includes a second feature index list set and a service identifier corresponding to each feature index list in the second feature index list set; receiving, by the user plane network element, service transmission data corresponding to a first session; determining, by the user plane network element, a feature index that is in the second feature index list set and for which an eigenvalue cannot be obtained based on the service transmission data, to obtain a network data feature index list; sending, by the user plane network element, the network data feature index list to a database network element; and receiving, by the user plane network element from the database network element, a network data eigenvalue list corresponding to the network data feature index list.

In the sixth aspect, the user plane network element sends the feature index list to the database network element, and receives the network data eigenvalue list that corresponds to the feature index list and that is obtained by the database network element, so that the user plane network element can proceed with a subsequent step during service type identification.

Optionally, after determining the feature index that is in the second feature index list set and for which the eigenvalue cannot be obtained based on the service transmission data, the user plane network element may remove a repetitive feature index, to obtain the network data feature index list.

With reference to the sixth aspect, in a first possible implementation, third information includes at least one of the following information: a time at which the user plane network element receives the service transmission data corresponding to the first session, a session identifier of the first session, an identifier of a terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service data corresponding to the first session.

The user plane network element sends both the first service identifier set and the at least one of the information to the database network element, so that the database network element can determine a network data value based on the at least one of the information, to improve accuracy of the determined network data value, and improve service type identification accuracy.

In conclusion, according to the communication method provided in this application, the database network element obtains the training data, the data analytics network element obtains feature index lists corresponding to service types based on the training data, the database network element records the feature index lists and sends the feature index lists to the control plane network element, the control plane network element sends a feature index list supported by the user plane network element to the user plane network element, the user plane network element obtains, based on the feature index list, an eigenvalue corresponding to the service transmission data and sends the eigenvalue to the data analytics network element, and the data analytics network element determines a service type based on the eigenvalue and notifies the user plane network element of the service type.

The communication method implements a communication method in which a service type is identified by applying a big data analysis-based technology in a communications system.

In addition, the database network element may be deployed relatively close to the service server, the control plane network element, and the user plane network element. Therefore, when the database network element obtains the training data and delivers the feature index to the control plane network element, the delay is reduced.

When the training data includes the network data, the user plane network element may further request the network data value from the database network element. Therefore, the delay can also be reduced.

According to a seventh aspect, this application provides a database network element. The database network element includes modules configured to perform the communication method in any one of the first aspect or the possible implementations of the first aspect. The modules included in the database network element may be implemented by using software and/or hardware.

According to an eighth aspect, this application provides a data analytics network element. The data analytics network element includes modules configured to perform the communication method in any one of the second aspect or the possible implementation of the second aspect. The modules included in the data analytics network element may be implemented by using software and/or hardware.

According to a ninth aspect, this application provides a control plane network element. The control plane network element includes modules configured to perform the communication method in any one of the third aspect or the possible implementation of the third aspect. The modules included in the control plane network element may be implemented by using software and/or hardware.

According to a tenth aspect, this application provides a control plane network element. The control plane network element includes modules configured to perform the communication method in any one of the fourth aspect or the possible implementation of the fourth aspect. The modules included in the control plane network element may be implemented by using software and/or hardware.

According to an eleventh aspect, this application provides a user plane network element. The user plane network element includes modules configured to perform the communication method in any one of the fifth aspect or the possible implementation of the fifth aspect. The modules included in the user plane network element may be implemented by using software and/or hardware.

According to a twelfth aspect, this application provides a user plane network element. The user plane network element includes modules configured to perform the communication method in any one of the sixth aspect or the possible implementation of the sixth aspect. The modules included in the user plane network element may be implemented by using software and/or hardware.

According to a thirteenth aspect, this application provides a database network element. The database network element includes a processor, a transmitter, and a receiver. The processor is configured to execute a program. When the processor executes code, the processor, the transmitter, and the receiver implement the communication method in any one of the first aspect or the possible implementations of the first aspect.

Optionally, the database network element may further include a memory, and the memory is configured to store the code executed by the processor.

According to a fourteenth aspect, this application provides a data analytics network element. The data analytics network element includes a processor, a transmitter, and a receiver. The processor is configured to execute a program. When the processor executes code, the processor, the transmitter, and the receiver implement the communication method in any one of the second aspect or the possible implementation of the second aspect.

Optionally, the data analytics network element may further include a memory, and the memory is configured to store the code executed by the processor.

According to a fifteenth aspect, this application provides a control plane network element. The control plane network element includes a processor, a transmitter, and a receiver. The processor is configured to execute a program. When the processor executes code, the processor, the transmitter, and the receiver implement the communication method in any one of the third aspect or the possible implementation of the third aspect.

Optionally, the control plane network element may further include a memory, and the memory is configured to store the code executed by the processor.

According to a sixteenth aspect, this application provides a control plane network element. The control plane network element includes a processor, a transmitter, and a receiver. The processor is configured to execute a program. When the processor executes code, the processor, the transmitter, and the receiver implement the communication method in any one of the fourth aspect or the possible implementation of the fourth aspect.

Optionally, the control plane network element may further include a memory, and the memory is configured to store the code executed by the processor.

According to a seventeenth aspect, this application provides a user plane network element. The user plane network element includes a processor, a transmitter, and a receiver. The processor is configured to execute a program. When the processor executes code, the processor, the transmitter, and the receiver implement the communication method in any one of the fifth aspect or the possible implementation of the fifth aspect.

Optionally, the user plane network element may further include a memory, and the memory is configured to store the code executed by the processor.

According to an eighteenth aspect, this application provides a user plane network element. The user plane network element includes a processor, a transmitter, and a receiver. The processor is configured to execute a program. When the processor executes code, the processor, the transmitter, and the receiver implement the communication method in any one of the sixth aspect or the possible implementation of the sixth aspect.

Optionally, the user plane network element may further include a memory, and the memory is configured to store the code executed by the processor.

According to a nineteenth aspect, this application provides a computer-readable storage medium. The computer-readable storage medium stores program code executed by a database network element. The program code includes an instruction used to perform the communication method in any one of the first aspect or the possible implementations of the first aspect.

According to a twentieth aspect, this application provides a computer-readable storage medium. The computer-readable storage medium stores program code executed by a data analytics network element. The program code includes an instruction used to perform the communication method in any one of the second aspect or the possible implementation of the second aspect.

According to a twenty-first aspect, this application provides a computer-readable storage medium. The computer-readable storage medium stores program code executed by a control plane network element. The program code includes an instruction used to perform the communication method in any one of the third aspect or the possible implementation of the third aspect.

According to a twenty-second aspect, this application provides a computer-readable storage medium. The computer-readable storage medium stores program code executed by a control plane network element. The program code includes an instruction used to perform the communication method in any one of the fourth aspect or the possible implementation of the fourth aspect.

According to a twenty-third aspect, this application provides a computer-readable storage medium. The computer-readable storage medium stores program code executed by a user plane network element. The program code includes an instruction used to perform the communication method in any one of the fifth aspect or the possible implementation of the fifth aspect.

According to a twenty-fourth aspect, this application provides a computer-readable storage medium. The computer-readable storage medium stores program code executed by a user plane network element. The program code includes an instruction used to perform the communication method in any one of the sixth aspect or the possible implementation of the sixth aspect.

According to a twenty-fifth aspect, this application provides a computer program product including an instruction. When the computer program product is run on a database network element, the database network element is enabled to perform the communication method in any one of the first aspect or the possible implementations of the first aspect.

According to a twenty-sixth aspect, this application provides a computer program product including an instruction. When the computer program product is run on a data analytics network element, the data analytics network element is enabled to perform the communication method in any one of the second aspect or the possible implementation of the second aspect.

According to a twenty-seventh aspect, this application provides a computer program product including an instruction. When the computer program product is run on a control plane network element, the control plane network element is enabled to perform the communication method in any one of the third aspect or the possible implementation of the third aspect.

According to a twenty-eighth aspect, this application provides a computer program product including an instruction. When the computer program product is run on a control plane network element, the control plane network element is enabled to perform the communication method in any one of the fourth aspect or the possible implementation of the fourth aspect.

According to a twenty-ninth aspect, this application provides a computer program product including an instruction. When the computer program product is run on a user plane network element, the user plane network element is enabled to perform the communication method in any one of the fifth aspect or the possible implementation of the fifth aspect.

According to a thirtieth aspect, this application provides a computer program product including an instruction. When the computer program product is run on a user plane network element, the user plane network element is enabled to perform the communication method in any one of the fourth aspect or the possible implementation of the fourth aspect.

According to a thirty-first aspect, this application provides a chip system. The chip system includes a processor, configured to support a database network element, a data analytics network element, a control plane network element, or a user plane network element in implementing functions described in the foregoing corresponding aspects, for example, generating or processing information related to the communication method.

In a possible design, the chip system further includes a memory. The memory is configured to store a program instruction and data necessary for the database network element, the data analytics network element, the control plane network element, or the user plane network element. The chip system may include a chip, or may include a chip and another discrete device.

DESCRIPTION OF EMBODIMENTS

The following describes the technical solutions in this application with reference to the accompanying drawings.

Figure 1:
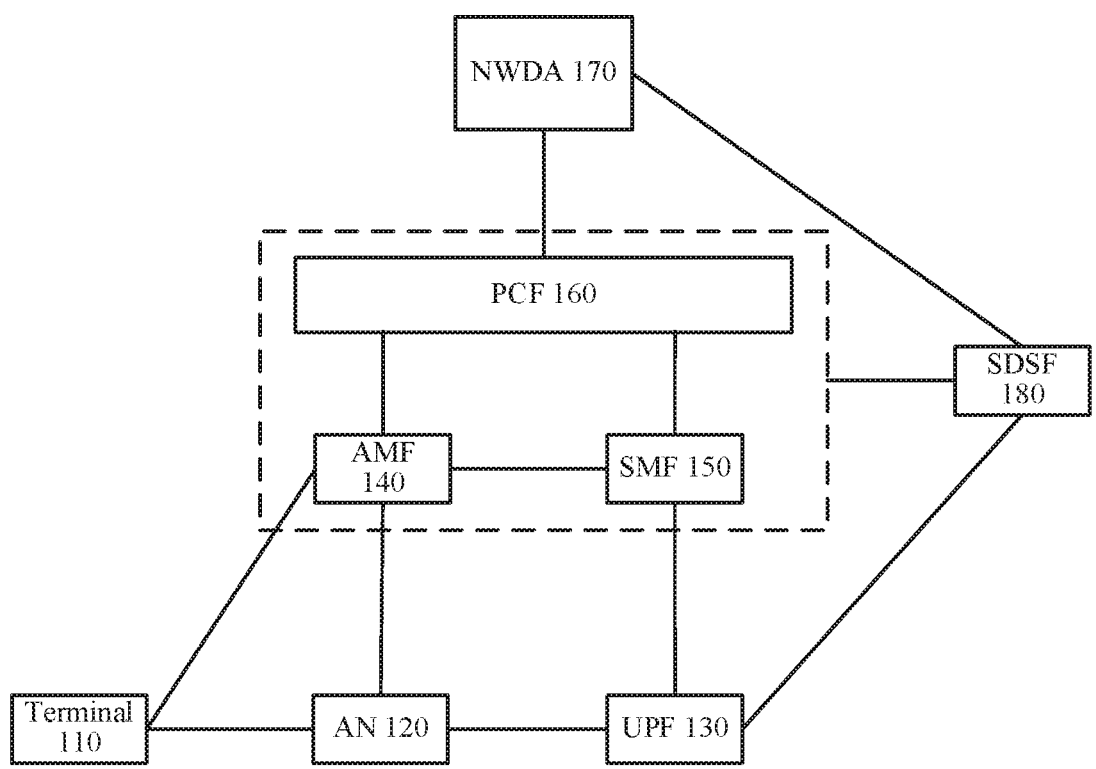
FIG. 1 is an architectural diagram of a system that can apply an application scenario of a communication method in embodiments of this application.

As shown in FIG. 1, a communications system that can apply a communication method in the embodiments of this application may include a terminal 110, an access network (AN) device 120, a UPF network element 130, an AMF network element 140, an SMF network element 150, a PCF network element 160, a network data analytics (NWDA) network element 170, and a structured data storage function (SDSF) network element 180.

It should be understood that the embodiments of this application are not limited to including a system architecture shown in FIG. 1. In addition, an apparatus in FIG. 1 may be hardware, or software obtained based on functional division, or a combination thereof.

The terminal 110 may be user equipment (UE). The terminal 110 may communicate with one or more core networks (CN) by using the AN device 120. The terminal may be referred to as an access terminal, a terminal device, a subscriber unit, a subscriber station, a mobile station, a mobile console, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in the internet of things or the internet of vehicles, or a terminal device in any form in a future network.

The AN device 120 may be specifically a radio access network (RAN) device.

In an example, the AN device 120 is a base station (BS). The base station, also referred to as a base station device, is a device connecting the terminal to a wireless network, and includes but is not limited to: a transmission reception point (TRP), a 5G NodeB (gNB), an evolved NodeB (eNB), a radio network controller (RNC), a NodeB (NB), a base station controller BSC), a base transceiver station (BTS), a home NodeB (for example, a Home evolved nodeB) (HNB), a baseband unit (BBU), a Wifi access point (AP), a small cell device (a pico), or the like.

It should be understood that a specific type of the base station is not limited in this embodiment of this application. In systems using different radio access technologies, a device having a base station function may have different names. For ease of description, in all the embodiments of this application, the foregoing apparatus providing a wireless communication function for the terminal is collectively referred to as a base station.

The UPF network element 130 has functions such as forwarding, encapsulation, and statistics collection of packets of the terminal.

The AMF network element 140 is responsible for performing access and mobility management on the terminal. For example, access and mobility management includes managing a mobility status, allocating a temporary identifier to the terminal, authenticating and authorizing the terminal, and the like.

The SMF network element 150 is responsible for selecting or reselecting a UPF network element, allocating an IP address, and the like, and may further be responsible for session establishment, modification, and releasing, QoS control, and the like.

The PCF network element 160 may include functions such as policy control, flow-based charging control, terminal subscription data management, QoS control, and the like.

The NWDA network element 170 may analyze network-level data, and notify another network element of a data analysis result by using the SDSF network element 180. The network-level data includes data generated, stored, and managed by a core network.

The SDSF network element 180 may store structured data. For example, the structured data includes at least one of application policy data, network topology data, and big-data analysis data in a network. The SDSF network element 180 may be configured to implement capability exposure inside or outside a network.

Figure 2:
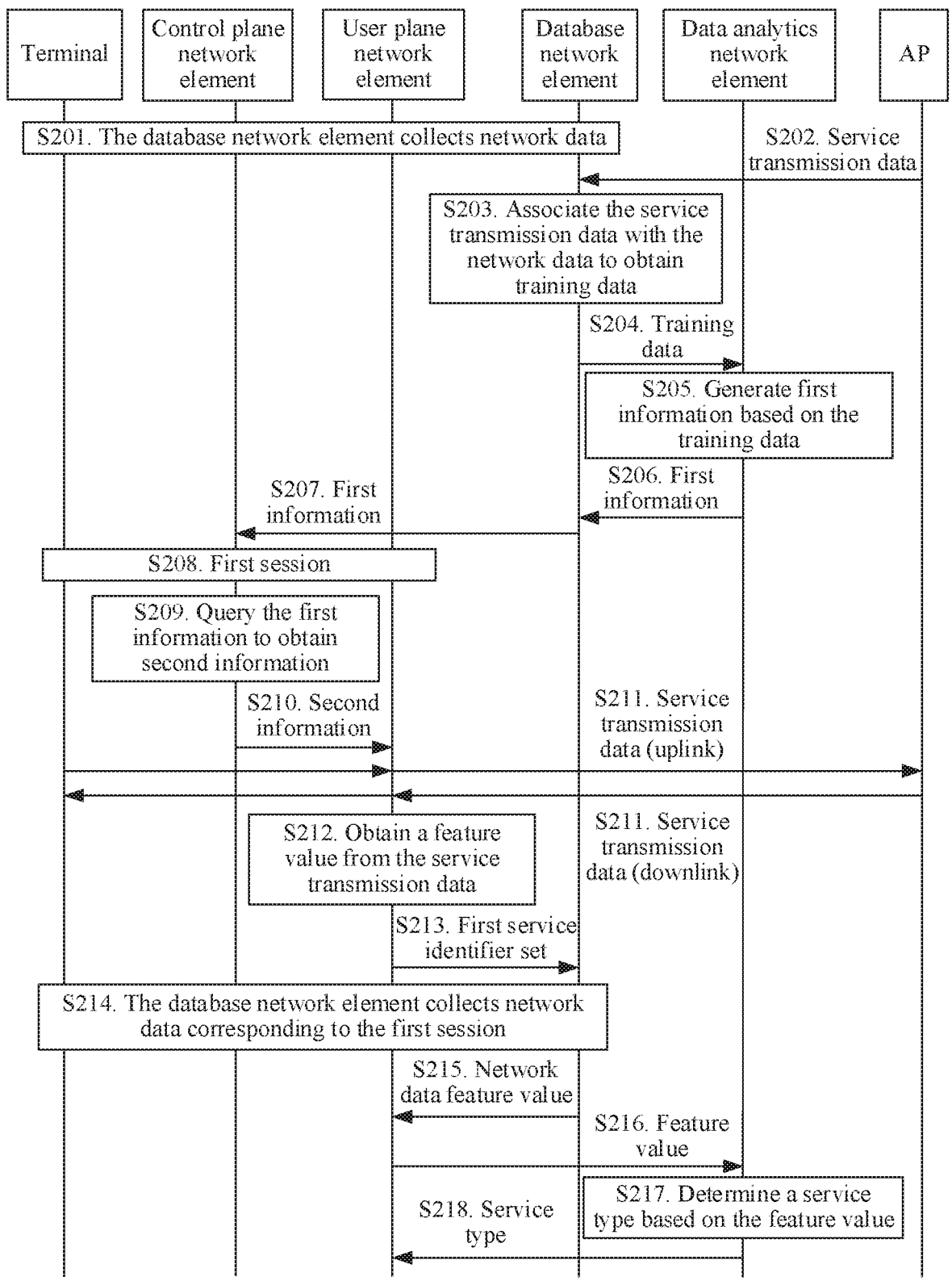
FIG. 2 is a schematic interaction flowchart of a communication method according to an embodiment of this application.

FIG. 2 is a schematic interaction flowchart of a communication method according to an embodiment of this application. It should be understood that, although steps or operations of the communication method are shown in FIG. 2, the steps or operations are merely an example, and other operations or variations of the operations in FIG. 2 may also be performed in this embodiment of this application. In addition, the steps in FIG. 2 may be performed in a sequence different from that presented in FIG. 2, and not all the operations in FIG. 2 may be performed.

S201. A database network element collects network data. Optionally, the database network element may collect historical network data from one or more of a terminal, an access network, a control plane network element, and a user plane network element, that is, network data that is generated before the collection.

The database network element includes but is not limited to an SDSF network element, for example, the SDSF 180 in FIG. 1.

The control plane network element includes but is not limited to a control plane function (CPF) network element. The CPF network element may include the AMF network element 140, the SMF network element 150, or the PCF network element 160 shown in FIG. 1.

The user plane network element may include a user plane function (UPF) network element. For example, the UPF network element may be the UPF network element 130 shown in FIG. 1.

The network data may include a DNN corresponding to a service type to which service transmission data associated with the network data belongs.

Optionally, step S201 may include: subscribing, by the database network element, to the network data from the control plane network element, and receiving the network data reported by the control plane network element in real-time or periodically.

The network data includes but is not limited to at least one of an IP address of the terminal, a terminal type, a cell identifier (Cell ID), a network congestion condition, and a start time for collecting the network data.

S202. The database network element collects the service transmission data. The service transmission data is specific service data, and may also be referred to as application data.

For example, the database network element may collect different service types of service transmission data. For example, a voice service, a WeChat service, and an in-vehicle navigation map service belong to different service types. It should be understood that the voice service, the WeChat service, and the in-vehicle navigation map service are merely examples, but should not constitute a limitation on the service type in this embodiment of this application.

The service transmission data may include at least one of the following information: an IP 5-tuple, a data packet, a size of the data packet, a start time for the service transmission data, a service type, service experience, and an extended field.

The service transmission data collected by the database network element may include uplink service transmission data and/or downlink service transmission data.

For example, the database network element may collect the service transmission data from an application platform (AP). The application platform may include an OTT (Over The Top) service center, a vertical management and control center, an operator platform, a third-party service server, or the like.

The service transmission data collected by the database network element is historical service transmission data, that is, service transmission data previously transmitted in a network.

It should be understood that a sequence of performing step S201 and step S202 is not limited in this embodiment of this application. For example, step S202 may be performed before step S201, or step S201 may be performed before step S202, or step S201 and step S202 may be performed in an interleaved manner or simultaneously.

S203. The database network element associates the service transmission data collected in step S202 with the network data collected in step S201, to obtain training data.

For example, the database network element associates the service transmission data with the network data by using information such as an IP 5-tuple or time, to obtain the training data.

For example, the service transmission data collected by the database network element includes information such as the IP of the terminal and time, and the time may be the start time for the service transmission data. The network data collected by the database network element also includes information such as the IP of the terminal and time, and the time may be a start time for generating the network data. In this case, the database network element may associate the service transmission data with the network data, to obtain the training data, where the service transmission data and the network data include same information such as the IP of the terminal or the time.

S204. The database network element sends the training data to a data analytics network element, where the training data includes the service transmission data and the network data that are associated with each other, and correspondingly, the data analytics network element receives the training data.

The data analytics network element includes but is not limited to an NWDA network element, for example, the NWDA network element 170 in FIG. 1.

Optionally, the database network element may proactively send the training data to the data analytics network element; or the data analytics network element may send, to the database network element, a request message for requesting the training data, and the database network element may send the training data to the data analytics network element after receiving the request message sent by the data analytics network element.

Optionally, if there is a relatively large amount of training data, the database network element may send the training data to the data analytics network element in batches. For example, when the database network element sends the training data to the data analytics network element, if congestion occurs on the network, the database network element may continue to send the training data to the data analytics network element when the network becomes idle.

S205. The data analytics network element generates first information based on the training data, where the first information includes a first feature index list set, a service identifier corresponding to each feature index list in the first feature index list set, and a DNN corresponding to the service identifier.

For example, the data analytics network element deployed with feature engineering generates a big data model based on the training data. In the feature engineering, original data is converted into a feature, so that an actual problem processed by a prediction model can be better presented by using the feature, and accuracy of unknown data is improved. In the feature engineering, the feature is obtained through generation, extraction, delete, or combination and variation by using an automated method or based on knowledge in a specific field to which a target problem belongs.

A process in which the data analytics network element converts the training data into a feature includes the following steps: integrating data, to be specific, integrating the data into one data set; pre-processing the data, to be specific, cleaning, formatting, and sampling the data; converting the data, to be specific, converting the data into key information by using the feature engineering; and modeling the data, to be specific, establishing a model, evaluating the model, and adjusting the model, where the model may also be referred to as the big data model used for identifying a service type.

The data analytics network element may separate the key information from the training data by using the feature engineering. The key information includes service feature lists corresponding to different service types. The service feature list may be referred to as a feature list for short.

One service feature list corresponds to one unique service type, so that the unique service type can be identified based on the service feature list.

Because each service type may have a unique service identifier, after analyzing the training data and obtaining a feature list corresponding to the service type, the data analytics network element may obtain a correspondence between the feature list and the service identifier based on a correspondence between the service type and the service identifier and a correspondence between the service type and the feature list. Each feature list corresponds to one service identifier.

For example, training data includes service transmission data corresponding to a video service and a payment service, and network data. The data analytics network element performs big data analysis on the training data, to obtain example feature lists corresponding to the video service and the payment service.

The example feature list corresponding to the video service may include the following features: a size of the first packet in a video service flow, an average value of sizes of all packets in the video service flow, entropy of the sizes of all packets in the video service flow, a use time of the video service, a terminal location, and a cell identifier. The size of the first packet in the video service flow, the average value of the sizes of all packets in the video service flow, the entropy of the sizes of all packets in the video service flow, and the use time of the video service may be obtained by the data analytics network element based on the service transmission data corresponding to the video service, and the terminal location and the cell identifier may be obtained by the data analytics network element based on the network data associated with the service transmission data corresponding to the video service.

The example feature list corresponding to the payment service may include the following features: an average value of uplink and downlink intervals of all packets in a payment service flow, entropy of the uplink and downlink intervals of all packets in the payment service flow, a use time of the payment service, and a terminal type. The average value of the uplink and downlink intervals of all packets in the payment service flow, the entropy of the uplink and downlink intervals of all packets in the payment service flow, and the use time of the payment service may be obtained by the data analytics network element based on the service transmission data corresponding to the payment service, and the terminal type may be obtained by the data analytics network element based on the network data associated with the service transmission data corresponding to the payment service.

After obtaining a plurality of feature lists, the data analytics network element may mix these feature lists, or integrate a newly obtained feature list into an existing feature list set and calculate a union set, to obtain a general feature list in which there is no repetitive feature.

For example, after features in the feature lists corresponding to the video service and the payment service are mixed, a general feature list shown in Table 1 is obtained.

TABLE 1

| General feature list |
| --- |
| Feature |
| Use time |
| Size of the first packet in a flow |
| Average value of sizes of all packets in a flow |
| Entropy of sizes of all packets in a flow |
| Average value of uplink and downlink intervals of all packets in a flow |
| Entropy of uplink and downlink intervals of all packets in a flow |
| Terminal type |
| Terminal location |
| Cell identifier |

The data analytics network element may allocate an index to each feature based on the general feature list. A correspondence between a feature in the general feature list shown in Table 1 and an index is shown in Table 2.

TABLE 2

| Correspondence between a feature and an index | |
| --- | --- |
| Feature | Index |
| Use time | 1 |
| Size of the first packet in a flow | 2 |
| Average value of sizes of all packets in a flow | 3 |
| Entropy of sizes of all packets in a flow | 4 |
| Average value of uplink and downlink intervals of all packets in a flow | 5 |
| Entropy of uplink and downlink intervals of all packets in a flow | 6 |
| Terminal type | 7 |
| Terminal location | 8 |
| Cell identifier | 9 |

After obtaining a general feature index list corresponding to a plurality of service types, the data analytics network element may obtain, based on the general feature index list and feature lists corresponding to different service types, feature index lists corresponding to the different service types.

For example, a feature index list corresponding to the payment service and a feature index list corresponding to the video service are obtained based on a general feature index list shown in Table 2, and are shown in Table 3.

TABLE 3

| Feature index lists corresponding to the payment service and the video service | |
| --- | --- |
| Service type | Feature index list |
| Payment service | {1, 5, 6, 7} |
| Video service | {1, 2, 3, 4, 8, 9} |

Optionally, the feature index list may be extended to binary space. Assuming that the total feature index list includes n features, each feature index list may be represented as an n-dimensional binary character string.

For example, the general feature list shown in Table 2 includes nine features. In this case, the feature index list may be represented as a binary character string with a length of 9. For example, a binary feature index list corresponding to the payment service may be represented as 100011100, and a binary feature index list corresponding to the video service may be represented as 111100011.

A plurality of feature index lists obtained by the data analytics network element may form one feature index list set, and the feature index list set may be referred to as a first feature index list set.

One service type may correspond to a plurality of feature lists. Correspondingly, one service type may correspond to a plurality of feature index lists.

For example, network congestion conditions may be different in different geographic locations. Therefore, users may use the payment service at different time, and the data analytics network element may generate, based on the training data, a plurality of feature lists corresponding to the payment service.

For example, in a working period from 7:00 AM to 17:00 PM, there are about 100,000 users using the payment service in a city A. After the data analytics network element performs big data analysis on training data from the city, a feature index list corresponding to the payment service is shown in Table 4.

TABLE 4

| Feature list corresponding to the payment service (city A, from 7:00 AM to 17:00 PM) | |
| --- | --- |
| Service type | Feature list |
| Payment service | {<br>use time,<br>average value of uplink and downlink intervals of all packets in a flow,<br>entropy of uplink and downlink intervals of all packets in a flow,<br>terminal type<br>} |

For example, in an off-duty period from 17:00 PM to 21:00 PM, a quantity of users using the payment service in the city A greatly increases to 500,000. After the data analytics network element performs big data analysis on training data from the city, a feature index list corresponding to the payment service is shown in Table 5.

TABLE 5

| Feature index list corresponding to the payment service (city A, from 17:00 PM to 21:00 PM) | |
| --- | --- |
| Service type | Feature list |
| Payment service | {<br>use time,<br>average value of uplink and downlink intervals of all packets in a flow,<br>entropy of uplink and downlink intervals of all packets in a flow,<br>terminal type,<br>terminal location,<br>cell identifier<br>} |

For example, in a period from 21:00 PM to 7:00 AM, a quantity of users using the payment service in the city A greatly decreases to 20,000. After the data analytics network element performs big data analysis on training data from the city, a feature index list corresponding to the payment service is shown in Table 6.

TABLE 6

| Feature index list corresponding to the payment service (city A, from 21:00 PM to 7:00 AM) | |
| --- | --- |
| Service type | Feature index list |
| Payment service | {<br>use time,<br>average value of uplink and downlink intervals of all packets in a flow,<br>entropy of uplink and downlink intervals of all packets in a flow<br>} |

It can be learned from Table 4 to Table 6 that feature lists corresponding to the payment service in a busy network and an idle network are different on the same geographic location.

Figure 4:
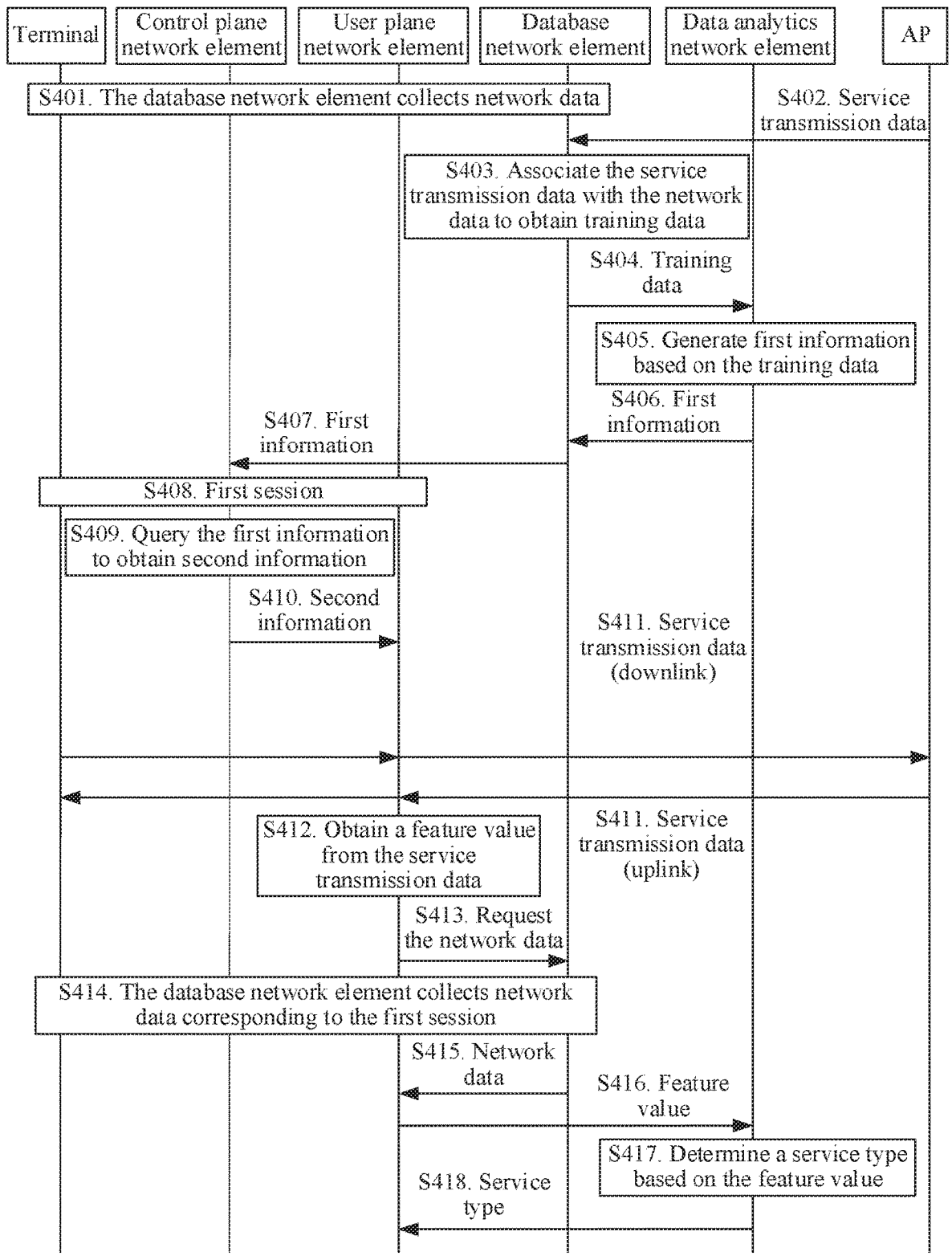
FIG. 4 is a schematic interaction flowchart of a communication method according to another embodiment of this application.
Figure 5:
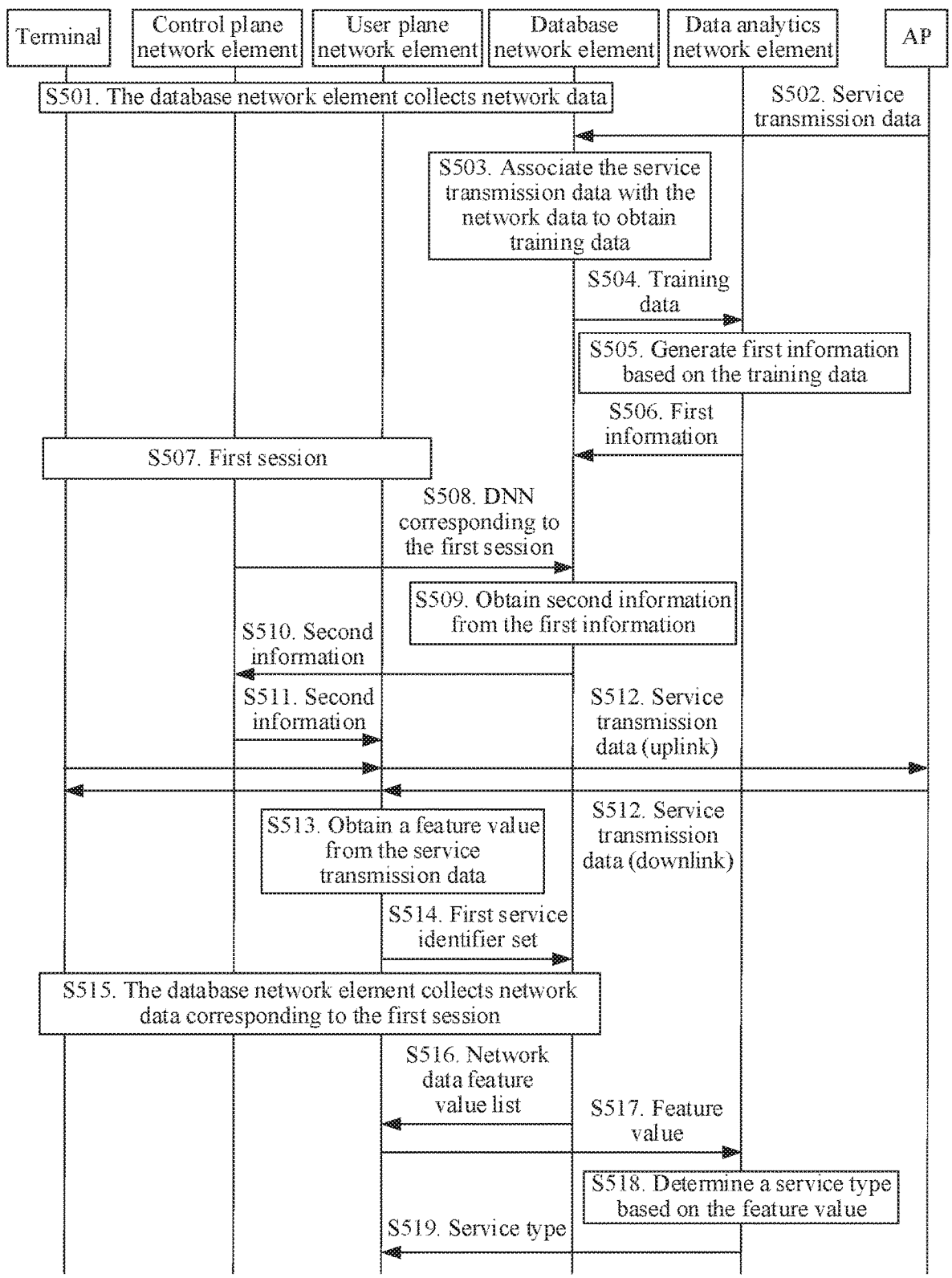
FIG. 5 is a schematic interaction flowchart of a communication method according to another embodiment of this application.
Figure 6:
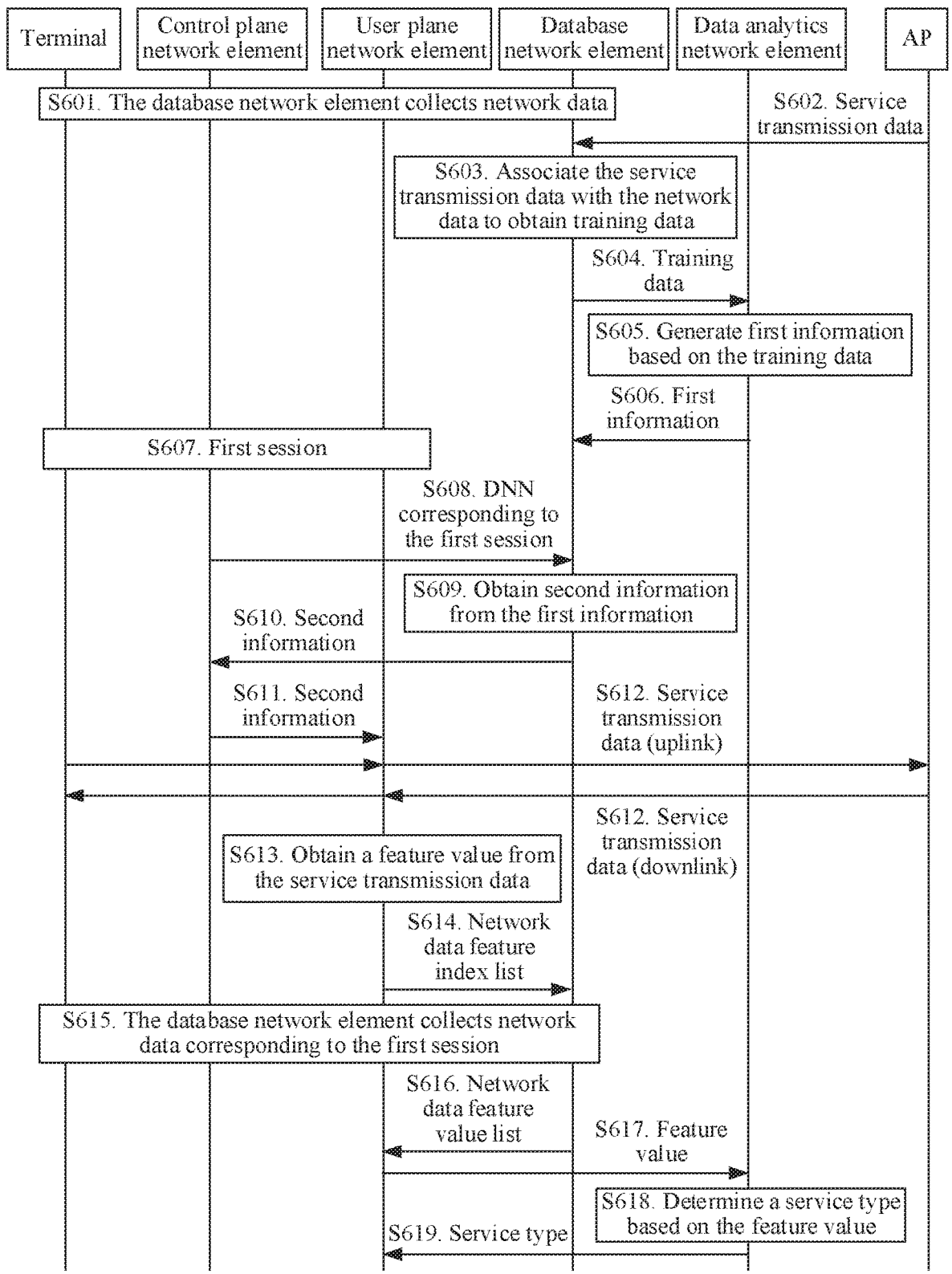
FIG. 6 is a schematic interaction flowchart of a communication method according to another embodiment of this application.

Based on the correspondence between a feature and an index shown in Table 2, a feature index list corresponding to the feature lists corresponding to the payment service in FIG. 4 to FIG. 6 is shown in Table 7.

TABLE 7

| Feature index lists corresponding to the payment service in the city A | |
| --- | --- |
| Service type | Feature list |
| Payment service | Feature index list-1: {1, 5, 6, 7}<br>Feature index list-2: {1, 5, 6, 7, 8, 9}<br>Feature index list-3: {1, 5, 6} |

In this embodiment of this application, each service type may have a unique service identifier, and in terms of a feature index list, this means that one feature index list corresponds to one service identifier. A plurality of feature lists correspond to one service type, and in terms of a feature index list, this means that a plurality of feature index lists correspond to one service identifier.

A correspondence between the three feature index lists that are shown in Table 7 and that correspond to the payment service and a service identifier is shown in Table 8. To be specific, a service identifier of the payment service corresponds to the feature index list-1, the feature index list-2, and the feature index list-3. In other words, the feature index list-1, the feature index list-2, and the feature index list-3 all correspond to the service identifier of the payment service.

TABLE 8

| Correspondence between the service identifier of the payment service and the plurality of feature index lists | |
| --- | --- |
| Service identifier | Feature index list |
| Service identifier of the payment service | Feature index list-1<br>Feature index list-2<br>Feature index list-3 |

It should be understood that Table 8 is merely an example in which the plurality of feature index lists correspond to the same service identifier, but should not constitute a limitation on an expression form or a storage form of the correspondence between the feature index lists and the service identifier. For example, the correspondence between the service identifier of the payment service and the plurality of feature index lists may be shown in Table 9.

TABLE 9

| Correspondence between the service identifier of the payment service and the plurality of feature index lists | |
| --- | --- |
| Service identifier | Feature index list |
| Service identifier of the payment service | Feature index list-1 |
| Service identifier of the payment service | Feature index list-2 |
| Service identifier of the payment service | Feature index list-3 |

Because the network data may include a DNN corresponding to a service type, after obtaining a feature index list corresponding to the service type and a correspondence between the feature index list and a service identifier, the data analytics network element may further obtain a correspondence between the DNN corresponding to the service type and the service identifier corresponding to the service type.

An example of a correspondence between a DNN, a service identifier, and a feature index list is shown in Table 10.

TABLE 10

Correspondence between a DNN, a service identifier, and a feature index list

| DNN | Service identifier | Feature index list |
|---|---|---|
| DNN-1 | Service identifier 1 | {1, 5, 6, 7} |
| | Service identifier 2 | {1, 2, 3, 4, 8, 9} |
| DNN-2 | Service identifier 3 | {1, 4, 7, . . . , 19} |
| | | {1, 2, 3, . . . , 1000} |
| DNN-3 | Service identifier 4 | {1, 2, 3, . . . , 200} |

It should be understood that an expression form of the correspondence between a DNN, a service identifier, and a feature index list in Table 10 is merely an example, but should not constitute a limitation on this embodiment of this application. The correspondence between a DNN, a service identifier, and a feature index list may have another expression form, for example, an expression form shown in Table 11.

TABLE 11

Correspondence between a DNN, a service identifier, and a feature index list

| DNN | Service identifier | Feature index fist |
|---|---|---|
| DNN-1 | Service identifier 1 | {1, 5, 6, 7} |
| DNN-1 | Service identifier 2 | {1, 2, 3, 4, 8, 9} |
| DNN-2 | Service identifier 3 | {1, 4, 7, . . . , 19} |
| DNN-2 | Service identifier 3 | {1, 2, 3, . . . , 1000} |
| DNN-3 | Service identifier 4 | {1, 2, 3, . . . , 200} |

Table 10 or Table 11 includes five feature index lists, each of the five feature index lists corresponds to a unique service identifier, and four service types corresponding to the five feature index lists correspond to three different DNNs.

It should be understood that the quantity 5 of the feature index lists, the maximum quantity 1000 of feature indexes, the quantity 3 of the DNNs, and a quantity of service identifiers corresponding to each DNN network that are shown in Table 10 or Table 11 are merely an example, but should not constitute a limitation on this embodiment of this application.

S206. The data analytics network element sends first information to the database network element, and correspondingly, the database network element receives the first information.

Optionally, the first information may further include a correspondence between a feature and an index. For example, the first information may include the correspondence shown in Table 2. In this way, the database network element can learn of a feature corresponding to a feature index in each feature index list in the first feature index set.

Optionally, after receiving the first information, the database network element may store the first information.

In a possible design, after receiving the first information, the database network element may store the first information in the following manner: The database network element may store, by using a service identifier as data index information, a feature index list corresponding to each service identifier and a DNN corresponding to each service identifier.

In another possible design, after receiving the first information, the database network element may store the first information in the following manner: The database network element may store, by using a DNN as data index information, a service identifier corresponding to each DNN and a feature index list corresponding to each service identifier.

S207. The database network element sends the first information to the control plane network element, and correspondingly, the control plane network element receives the first information.

When the first information sent by the data analytics network element to the database network element includes the correspondence between a feature and an index, the first information sent by the database network element to the control plane network element may also include the correspondence between a feature and an index.

The control plane network element may be an AMF network element, an SMF network element, a PCF network element, or another control plane function network element. For example, the control plane network element may be the AMF network element 140, the SMF network element 150, or the PCF network element 160 shown in FIG. 1.

Optionally, after receiving the first information, the control plane network element may store the first information.

When the control plane network element is the SMF network element or the PCF network element, the database network element may directly deliver the first information to the SMF network element or the PCF network element or deliver the first information to the SMF network element or the PCF network element by using a network exposure function (NEF) network element.

S208. The terminal initiates a process for modifying an existing session or a process for establishing a new session. For ease of subsequent description, the session is referred to as a first session.

Optionally, the first session may be a service data flow ( ), and the first session may be identified by using an IP 5-tuple.

When UE initiates the first session, a DNN associated with the first session is added. For ease of subsequent description, the DNN associated with the first session may be referred to as a first DNN.

S209. The control plane network element queries the first information based on the first DNN to obtain second information, where the second information includes a second feature index list set corresponding to the first DNN and a service identifier corresponding to each feature index list in the second feature index list set.

Specifically, the control plane network element may screen the locally stored first information based on the first DNN, and find a feature index list and a service identifier that correspond to the first DNN. The feature index list that corresponds to the first DNN and that is obtained by screening the first information forms the second feature index list set.

The control plane network element generates the second information based on the second feature index list set and the service identifier obtained through the screening, where the second information includes the second feature index list set and the service identifier obtained through the screening.

For example, when the first information received by the control plane network element from the database network element includes content shown in Table 11, if the first DNN is the DNN-1, the control plane network element may generate the second information based on Table 11, where the second information may include content shown in Table 12.

TABLE 12

Service identifier and feature index list
included in the second information

| Service identifier | Feature index list |
| --- | --- |
| Service identifier 1 | {1, 5, 6, 7} |
| Service identifier 2 | {1, 2, 3, 4, 8, 9} |

Optionally, when the first information received by the control plane network element from the database network element includes the correspondence between a feature and an index, the second information sent by the control plane network element to the user plane network element may also include the correspondence.

In this case, the user plane network element may locally store the correspondence between a feature and an index. When the control plane network element subsequently sends the second information corresponding to a service type to the user plane network element again, the second information can include only a feature index list corresponding to the service type, and the user plane network element may obtain, based on the stored correspondence between a feature and an index, a feature list corresponding to the feature index list.

S210. The control plane network element sends the second information to the user plane network element, and correspondingly, the user plane network element receives the second information.

The user plane network element includes but is not limited to a UPF network element. For example, the user plane network element may be the UPF network element 130 shown in FIG. 1.

Further, the control plane network element sending the second information to the user plane network element may be the SMF network element.

Further, after the SMF network element receives the first information from the database network element, when the terminal initiates the first session, the SMF network element determines the second information based on the first information, and sends the second information to the user plane network element.

Alternatively, after the PCF network element receives the first information from the database network element, when the terminal initiates the first session, the SMF network element obtains, from the PCF network element, the second information determined by the PCF network element based on the first information, and the SMF network element sends the second information to the UPF network element.

The foregoing implementation in which the control plane network element sends the second information to the user plane network element is merely an example, but should not constitute a limitation on this embodiment of this application.

S211. The user plane network element receives service transmission data corresponding to the terminal.

It should be understood that the service transmission data may be uplink service transmission data or downlink service transmission data.

It should be understood that step S211 may be alternatively performed before step S209 or step S210.

S212. The user plane network element obtains an eigenvalue from the service transmission data.

For example, the user plane network element obtains, from the service transmission data, an eigenvalue list corresponding to each feature index list in the second feature index list set.

For example, when the second feature index list set includes the feature index lists in Table 12, and the feature indexes in Table 12 include the indexes in Table 2, the user plane network element may obtain eigenvalues corresponding to the features "use time", "size of the first packet in a flow", "average value of sizes of all packets in a flow", "entropy of sizes of all packets in a flow", "average value of uplink and downlink intervals of all packets in a flow", and "entropy of uplink and downlink intervals of all packets in a flow" that correspond to the feature indexes 1, 2, 3, 4, 5, and 6.

For example, the user plane network element may obtain, from the service transmission data, eigenvalues shown in Table 13.

TABLE 13

Eigenvalue obtained based on the service transmission data

| Feature | Feature index | Eigenvalue |
| --- | --- | --- |
| Use time | 1 | 9:00 AM |
| Size of the first packet in a flow | 2 | 20 bits |
| Average value of sizes of all packets in a flow | 3 | 30 bits |
| Entropy of sizes of all packets in a flow | 4 | 2 |
| Average value of uplink and downlink intervals of all packets in a flow | 5 | 10 milliseconds |
| Entropy of uplink and downlink intervals of all packets in a flow | 6 | 1.5 |
| Terminal type | 7 | |
| Terminal location | 8 | |
| Cell identifier | 9 | |

It can be learned from Table 13 Thai because The terminal type, the terminal location, and the cell identifier all belong to the network data, the user plane network element cannot obtain, based on the service transmission data, eigenvalues corresponding to the terminal type, the terminal location, and the cell identifier that respectively correspond to the feature indexes 7, 8, and 9. Next, the user plane network element performs step S213.

S213. The user plane network element sends third information to the database network element, where the third information includes a first service identifier set, and correspondingly, the database network element receives the third information sent by the user plane network element.

For example, after obtaining the eigenvalue from the service transmission data, the user plane network element determines all feature indexes that are in the second feature index list set and for which eigenvalues cannot be obtained based on the service transmission data. For ease of subsequent description, a feature index list including the feature indexes that are in the second feature index list set and for which the eigenvalues cannot be obtained based on the service transmission data is referred to as a first network data feature index list.

Because the training data includes the network data, when a feature index list is generated based on the training data the feature index list may include a feature index corresponding to the network data. An eigenvalue corresponding to the feature index corresponding to the network data cannot be obtained from the service transmission data. The user plane network element may screen out the feature index for which the eigenvalue cannot be obtained from the service transmission data, to obtain the first network data feature index list.

For example, the user plane network element cannot obtain, from the service transmission data, the eigenvalues corresponding to the features "terminal type", "terminal location", and "cell identifier" that correspond to the feature indexes 7, 8, and 9 in Table 12. In other words, the feature indexes 7, 8, and 9 form the first network data feature index list shown in Table 14.

TABLE 14

First network data feature index list

| Feature index |
|---|
| 7 |
| 8 |
| 9 |

After obtaining the first network data feature index list, the user plane network element may remove a repetitive feature index in the first network data index list, to obtain a first network data feature index list in which there is no repetitive feature index.

After determining the first network data feature index list, the user plane network element may determine a service identifier corresponding to a feature index list to which each feature index in the first network data feature index list belongs. Service identifiers corresponding to all the feature indexes in the first network data feature index list form the first service identifier set.

For example, a service identifier corresponding to the feature index 7 that is in Table 12 and for which an eigenvalue cannot be obtained based on the service transmission data is the service identifier 1, and a service identifier corresponding to the indexes 8 and 9 that are in Table 12 and for which eigenvalues cannot be obtained based on the service transmission data is the service identifier 2. Therefore, a correspondence between a first network data feature index list and a service identifier shown in Table 15 can be obtained.

TABLE 15

Correspondence between a first network data feature index list and a service identifier

| Index | Service identifier |
|---|---|
| 7 | Service identifier 1 |
| 8 | Service identifier 2 |
| 9 | Service identifier 2 |

The user plane network element may obtain, based on Table 15, the first service identifier set including the service identifier 1 and the service identifier 2, where the first service identifier set is shown in Table 16.

TABLE 16

First service identifier set

| Service identifier |
|---|
| Service identifier 1 |
| Service identifier 2 |

S214. The database network element collects network data corresponding to the first session.

The network data corresponding to the first session may include a type of the terminal initiating the first session, a time at which the terminal initiates the first session, an identifier of a cell in which the terminal is located, and the like.

It should be understood that an execution sequence of step S214 is not limited in this embodiment of this application. Optionally, step S214 may be performed at any time between step S208 and step S213.

S215. The database network element sends a network data eigenvalue list to the user plane network element, and correspondingly, the user plane network element receives the network data eigenvalue list.

Specifically, the database network element collects the network data corresponding to the first session, and after receiving the third information sent by the user plane network element, the database network element may determine a feature index that is in a feature index list corresponding to each service identifier in the first service identifier set and that corresponds to the network data. A feature list including feature indexes that are in feature index lists corresponding to all service identifiers in the first service identifier set and that correspond to the network data may be referred to as a second network data feature index list.

After determining the second network data feature index list, the database network element obtains, from the collected network data corresponding to the first session, an eigenvalue of a feature corresponding to each feature index in the second network data feature index list. An eigenvalue list including the eigenvalue that is of the feature corresponding to each feature index in the second network data feature index list and that is obtained from the network data corresponding to the first session may be referred to as the network data eigenvalue list.

For example, when the first service identifier set includes the service identifier 1 and the service identifier 2 in Table 16, the database network element may obtain, from the network data corresponding to the first session, data eigenvalues corresponding to the features "terminal type", "terminal location", and "cell identifier".

An example in which the database network element obtains the network data eigenvalue list is as follows: The database network element obtains the service identifier 1 and the service identifier 2 in the first service identifier set based on the first service identifier set in Table 16; and the database network element further finds, based on the first information obtained in step S206, that the "terminal type" corresponding to the feature index 7 corresponding to the service identifier 1 belongs to the network data, and determines, based on the network data obtained in step S214, an eigenvalue corresponding to the "terminal type". Similarly, the database network element determines eigenvalues based on the network data obtained in step S214, the "terminal location" corresponding to the feature index 8 corresponding to the service identifier 2, and the "cell identifier" corresponding to the feature index 9 corresponding to the service identifier 2, where the eigenvalues correspond to the "terminal location" and the "cell identifier".

An example of the network data eigenvalue list obtained by the database network element is shown in Table 17.

TABLE 17

Network data eigenvalue list corresponding
to the first service identifier set

| Service identifier | Feature index | Eigenvalue |
|---|---|---|
| Service identifier 1 | 7 | Huawei P10 |
| Service identifier 2 | 8 | Haidian District |
| Service identifier 2 | 9 | Cell ID-1 |

The database network element may send the network data eigenvalue list shown in Table 17 to the user plane network element.

S216. The user plane network element sends the second feature index list set and the eigenvalue list corresponding to each feature index list in the second feature index list set to the data analytics network element, where the second feature index list set and the eigenvalue list corresponding to each feature index list in the second feature index list set correspond to the first session.

The eigenvalue sent by the user plane network element to the data analytics network element includes not only the eigenvalue corresponding to the service transmission data, but also includes the network data eigenvalue. Correspondingly, the data analytics network element receives the foregoing eigenvalue from the user plane network element.

For example, the user plane network element may send, based on Table 13 and Table 17, an eigenvalue list shown in Table 18 to the data analytics network element. The eigenvalue list corresponds to the first session.

TABLE 18

Eigenvalue list corresponding to the first session

| Feature index list | Eigenvalue list |
|---|---|
| {1, 5, 6, 7} | {9:00 AM, 10 milliseconds, 1.5, Huawei P10} |
| {1, 2, 3, 4, 8, 9} | {9:00 AM, 20 bits, 30 bits, 2, Haidian, Cell ID-1} |

S217. The data analytics network element determines, based on the second feature index list set and the eigenvalue list corresponding to each feature index list in the second feature index list set, a service type corresponding to a data packet corresponding to the first session, where the second feature index list set and the eigenvalue list are received from the user plane network element.

Specifically, the data analytics network element may use the second feature index list set and the eigenvalue list corresponding to each feature index list in the second feature index list set that are sent by the user plane network element, as input parameters of the big data model generated in step S205. An output result of the big data model is the service type corresponding to the data packet corresponding to the first session.

Although the eigenvalue list sent by the user plane network element to the data analytics network element in step S216 includes both feature index list sets corresponding to the service identifier 1 and the service identifier 2 and an eigenvalue list corresponding to each feature index list in the feature index list sets, the service type determined by the data analytics network element can be only one of the two service types. In other words, the feature index list set and the eigenvalue list corresponding to each feature index list in the feature index list set that are sent by the user plane network element correspond to a unique service type.

S218. The data analytics network element sends, to the user plane network element, the service type determined in step S217, and correspondingly, the user plane network element receives the service type.

In this embodiment of this application, all the network elements operate jointly to identifying the service type. In addition, the database network element may be deployed close to an application server and a core network element in a distributed manner. Therefore, delays caused during obtaining the training data and delivering the first information can be reduced.

In the communication method in this embodiment of this application, the data analytics network element can determine, based on the network data and the service transmission data that correspond to the terminal, the service type corresponding to the terminal, thereby improving identification accuracy.

In this embodiment of this application, optionally, the first information may further include at least one of the following information corresponding to each feature index list in the first feature index list set: a network slice type, an SSC mode, and a PDU session type.

If the first information further includes the at least one of the network slice type, the SSC mode, and the PDU session type, in step S209, when the control plane network element queries the first information to obtain the second information, the control plane network element may screen out the second information based on both the DNN corresponding to the first session and the at least one of the network slice type, the SSC mode, and the PDU session type that correspond to the first session.

In other words, the second information is obtained by screening the first information, and each feature index list in the second feature index list set in the second information corresponds to the DNN corresponding to the first session and corresponds to the at least one of the network slice type, the SSC mode, and the PDU session type that correspond to the first session.

In this way, more accurate second information can be obtained, accuracy of an eigenvalue obtained by the user plane network element based on the second information can be improved, and finally service type identification accuracy is improved.

In this embodiment of this application, optionally, if the first service identifier set determined by the database network element is empty, step S213 and step S215 or even step S214 may be skipped in this embodiment of this application.

In this embodiment of this application, optionally, in step S213, the third information may further carry at least one of the following information: a time at which the user plane network element receives the service transmission data corresponding to the first session, a session identifier of the first session, an identifier of the terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

In this way, the database network element may further obtain, based on the at least one of the information carried in the third information, an eigenvalue corresponding to the network data that satisfies the at least one of the information. For example, the third information sent by the user plane network element to the database network element may carry, the IP address of the terminal, the IP address of the terminal is used to identify the terminal, and the database network element determines, based on the IP address of the terminal, the network data corresponding to the terminal. Therefore, the service type identification accuracy can be further improved.

In step S214 in this embodiment of this application, when collecting the network data corresponding to the first session, the database network element may further collect the network data based on one or more of information corresponding to the first session, such as the DNN, the IP of the terminal, the ID of the terminal, and a PDU session ID, where the network data corresponding to the first session.

In step S213 and step S215 in this embodiment of this application, the user plane network element may directly communicate with the database network element or communicate with the database network element by using the SMF network element.

Figure 3:
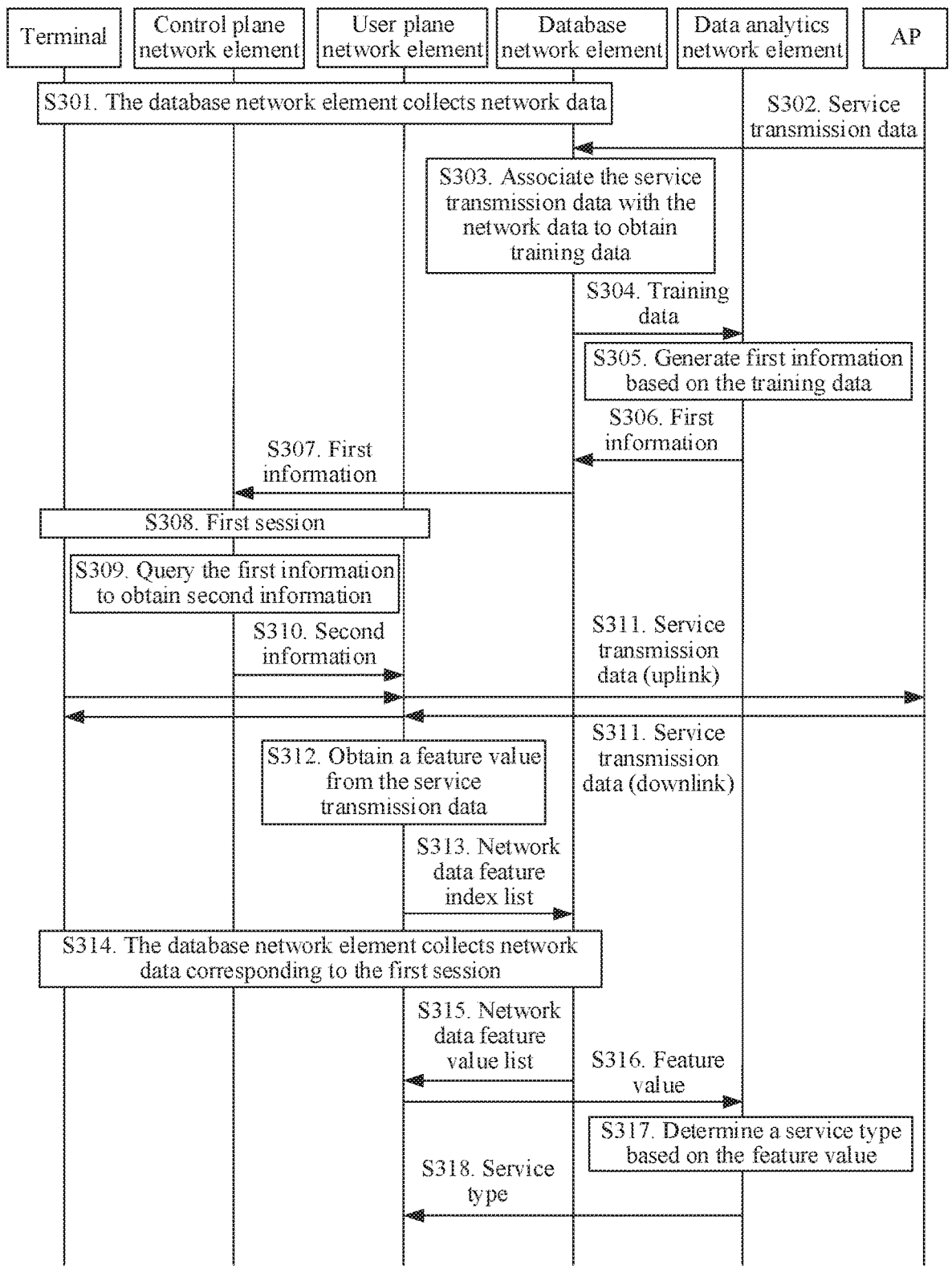
FIG. 3 is a schematic interaction flowchart of a communication method according to another embodiment of this application.

FIG. 3 is a schematic interaction flowchart of a communication method according to an embodiment of this application. It should be understood that, although steps or operations of the communication method are shown in FIG. 3, the steps or operations are merely an example, and other operations or variations of the operations in FIG. 3 may also be performed in this embodiment of this application. In addition, the steps in FIG. 3 may be performed in a sequence different from that presented in FIG. 3, and not all the operations in FIG. 3 may be performed.

For steps S301 to S312, refer to steps S201 to S212 in FIG. 2. For brevity, details are not described herein again.

S313. The user plane network element sends third information to the database network element, where the third information carries a network data feature index list, and correspondingly, the database network element receives the third information sent by the user plane network element.

For example, after obtaining the eigenvalue from the service transmission data, the user plane network element determines all feature indexes that are in the second feature index list set and for which eigenvalues cannot be obtained based on the service transmission data. The feature indexes that are in the second feature index list set and for which the eigenvalues cannot be obtained based on the service transmission data form the network data feature index list.

In other words, because the training data includes the network data, when the feature index list is generated based on the training data, the feature index list may include a feature index corresponding to the network data. An eigenvalue corresponding to the feature index corresponding to the network data cannot be obtained from the service transmission data. The user plane network element may screen out the feature index for which the eigenvalue cannot be obtained from the service transmission data, to obtain the network data feature index list.

For example, the user plane network element cannot obtain, from the service transmission data, the eigenvalues corresponding to the features "terminal type", "terminal location", and "cell identifier" that correspond to the feature indexes 7, 8, and 9 in Table 12. In other words, the feature indexes 7, 8, and 9 form the network data feature index list.

After obtaining the network data feature index list, the user plane network element may remove a repetitive feature index in the network data feature index list, to obtain a network data feature index list in which there is no repetitive feature index.

For step S314, refer to step S214 in FIG. 2. Details are not described herein again.

S315. The database network element sends the network data eigenvalue list to the user plane network element, and correspondingly, the user plane network element receives the network data eigenvalue list from the database network element.

For example, the database network element obtains, from the collected network data corresponding to the first session, an eigenvalue of a feature corresponding to each feature index in the network data feature index list. An eigenvalue list including the eigenvalue that corresponds to each feature index in the network data feature index list and that is obtained from the network data corresponding to the first session may be referred to as the network data eigenvalue list.

For example, when the network data feature index list includes the feature indexes 7, 8, and 9, the database network element may obtain, from the network data corresponding to the first session, network data eigenvalues corresponding to the features "terminal type", "terminal location", and "cell identifier".

For steps S316 to S318, refer to steps S216 to S218 in FIG. 2. Details are not described herein again.

FIG. 4 is a schematic interaction flowchart of a communication method according to an embodiment of this application. It should be understood that, although steps or operations of the communication method are shown in FIG. 4, the steps or operations are merely an example, and other operations or variations of the operations in FIG. 4 may also be performed in this embodiment of this application. In addition, the steps in FIG. 4 may be performed in a sequence different from that presented in FIG. 4, and not all the operations in FIG. 4 may be performed.

For steps S401 to S412, refer to steps S201 to S212 in FIG. 2. For brevity, details are not described herein again.

S413. The user plane network element sends third information to the database network element, where the third information is used to request network data corresponding to the first session, and correspondingly, the database network element receives the third information sent by the user plane network element.

For example, after obtaining the eigenvalue from the service transmission data, the user plane network element determines whether the second feature index list set includes a feature index for which an eigenvalue cannot be obtained based on the service transmission data.

If the second feature index list set includes the feature index for which the eigenvalue cannot be obtained based on the service transmission data, the user plane network element sends the third information to the database network element, to request the network data corresponding to the first session. For ease of subsequent description, an index list including the feature index that is in the second feature index list set and for which the eigenvalue cannot be obtained based on the service transmission data is referred to as a network data feature index list.

Because the training data includes the network data, when the feature index list is generated based on the training data, the feature index list may include a feature index corresponding to the network data. In other words, the eigenvalue that cannot be obtained based on the service transmission data may be obtained from the network data. Therefore, the user plane network element may send, to the database network element, the third information for requesting the network data.

For example, the user plane network element cannot obtain, from the service transmission data, the eigenvalues corresponding to the features "terminal type", "terminal location", and "cell identifier" that correspond to the feature indexes 7, 8, and 9 in Table 12. In this case, the user plane network element sends the third information to the database network element, to request the network data corresponding to the first session.

For example, the third information may include a time at which the user plane network element receives the service transmission data corresponding to the first session, a session identifier of the first session, an identifier of the terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

S414. The database network element may collect, based on the third information, the network data corresponding to the first session.

For example, the database network element may collect network data that satisfies at least one of the following conditions: the time at which the user plane network element receives the service transmission data corresponding to the first session, the session identifier of the first session, the identifier of the terminal corresponding to the first session, the IP address of the terminal corresponding to the first session, the port on the terminal corresponding to the first session, the IP address of the service server corresponding to the first session, the port that is on the service server and that corresponds to the first session, and the service transmission protocol for the service transmission data corresponding to the first session.

S415. The database network element sends the network data to the user plane network element, and correspondingly, the user plane network element receives the network data from the database network element.

After receiving, from the database network element, the network data corresponding to the first session, the user plane network element obtains, from the network data corresponding to the first session, an eigenvalue of a feature corresponding to a feature index in the network data feature index list. A list including the eigenvalue of the feature corresponding to the feature index in the network data feature index list may be referred to as a network data eigenvalue list.

For steps S416 to S418, refer to steps S216 to S218 in FIG. 2. Details are not described herein again.

FIG. 5 is a schematic interaction flowchart of a communication method according to an embodiment of this application. It should be understood that, although steps or operations of the communication method are shown in FIG. 5, the steps or operations are merely an example, and other operations or variations of the operations in FIG. 5 may also be performed in this embodiment of this application. In addition, the steps in FIG. 5 may be performed in a sequence different from that presented in FIG. 5, and not all the operations in FIG. 5 may be performed.

For steps S501 to S506, respectively refer to corresponding steps S201 to S206. For brevity, details are not described herein again.

For step S507, refer to step S208. For brevity, details are not described herein again.

S508. The control plane network element sends a DNN corresponding to a first session to the database network element, and correspondingly, the database network element receives, from the control plane network element, the DNN corresponding to the first session.

S509. The database network element queries the first information based on the DNN corresponding to the first session, to obtain second information, where the second information includes a second feature index list set and a service identifier corresponding to a service type corresponding to each feature index list in the second feature list set.

The database network element queries the first information based on the first DNN associated with the first session, to obtain the second information, where the second information includes the second feature index list set corresponding to the first DNN and the service identifier corresponding to each feature index list in the second feature index list set.

In other words, the database network element may screen the locally stored first information based on the first DNN, and find a feature index list and a service identifier that correspond to the first DNN. The feature index list that corresponds to the first DNN and that is obtained by screening the first information forms the second feature index list set.

The database network element generates the second information based on the second feature index list set and the service identifier obtained through the screening, where the second information includes the second feature index list set and the service identifier obtained through the screening.

For example, when the first information received by the database network element from the data analytics network element includes content shown in Table 11, if the first DNN is the DNN-1, the database network element may generate the second information based on Table 11, where the second information may include content shown in Table 12.

Optionally, when the first information received by the database network element from the data analytics network element includes the correspondence between a feature and an index, the second information sent by the database network element to the control plane network element may also include the correspondence.

In this case, the control plane network element may locally store the general feature list. When the database network element subsequently sends the second information corresponding to a service type to the control plane network element again, the second information can include only a feature index list corresponding to the service type. The control plane network element may send the correspondence between a feature and an index to the user plane network element, so that the user plane network element can obtain, based on the correspondence, a feature list corresponding to the feature index list in the second information.

S510. The database network element sends the second information to the control plane network element, and correspondingly, the control plane network element receives the second information sent by the database network element.

For steps S511 to S519, refer to corresponding steps S210 to S218. For brevity, details are not described herein again.

In this embodiment of this application, optionally, in step S508, the control plane network element may further send, to the database network element, at least one of the following information: a network slice type, an SSC mode, and a PDU session type. Correspondingly, the database network element further receives, from the CPF network element, the at least one of the information corresponding to the first session.

Correspondingly, in step S509, when querying for the second information from the first information, the database network element may further obtain the second information based on both the DNN corresponding to the first session and the at least one of the information corresponding to the first session. Therefore, more accurate second information is obtained, and service type identification accuracy is improved.

In this embodiment of this application, optionally, the second information may further include at least one of the following information corresponding to each feature index list in the second feature index list set: a DNN, a network slice type, a service and an SSC mode, and a PDU session type.

When the second information further includes the at least one of the information corresponding to each feature index list in the second feature index list set, if the terminal initiates a second session or another terminal initiates a second session, the control plane network element may determine, based on the at least one of the information corresponding to each feature index list in the second feature index list set, whether the second feature index list set includes a feature index list corresponding to the second session.

If the control plane network element determines, based on the at least one of the information corresponding to each feature index list in the second feature index list set, that the second feature index list set includes the feature index list corresponding to the second session, the control plane network element may skip requesting the second information from the database network element, thereby improving service type identification efficiency.

FIG. 6 is a schematic interactive flowchart of a communication method according to an embodiment of this application. It should be understood that, although steps or operations of the communication method are shown in FIG. 6, the steps or operations are merely an example, and other operations or variations of the operations in FIG. 6 may also be performed in this embodiment of this application. In addition, the steps in FIG. 6 may be performed in a sequence different from that presented in FIG. 6, and not all the operations in FIG. 6 may be performed.

For steps S601 to S613, refer to steps S501 to S513 in FIG. 5. For brevity, details are not described herein again.

For steps S614 to S616, refer to steps S313 to S315 in FIG. 3. For brevity, details are not described herein again.

For steps S617 to S619, refer to steps S517 to S519 in FIG. 5. For brevity, details are not described herein again.

Figure 7:
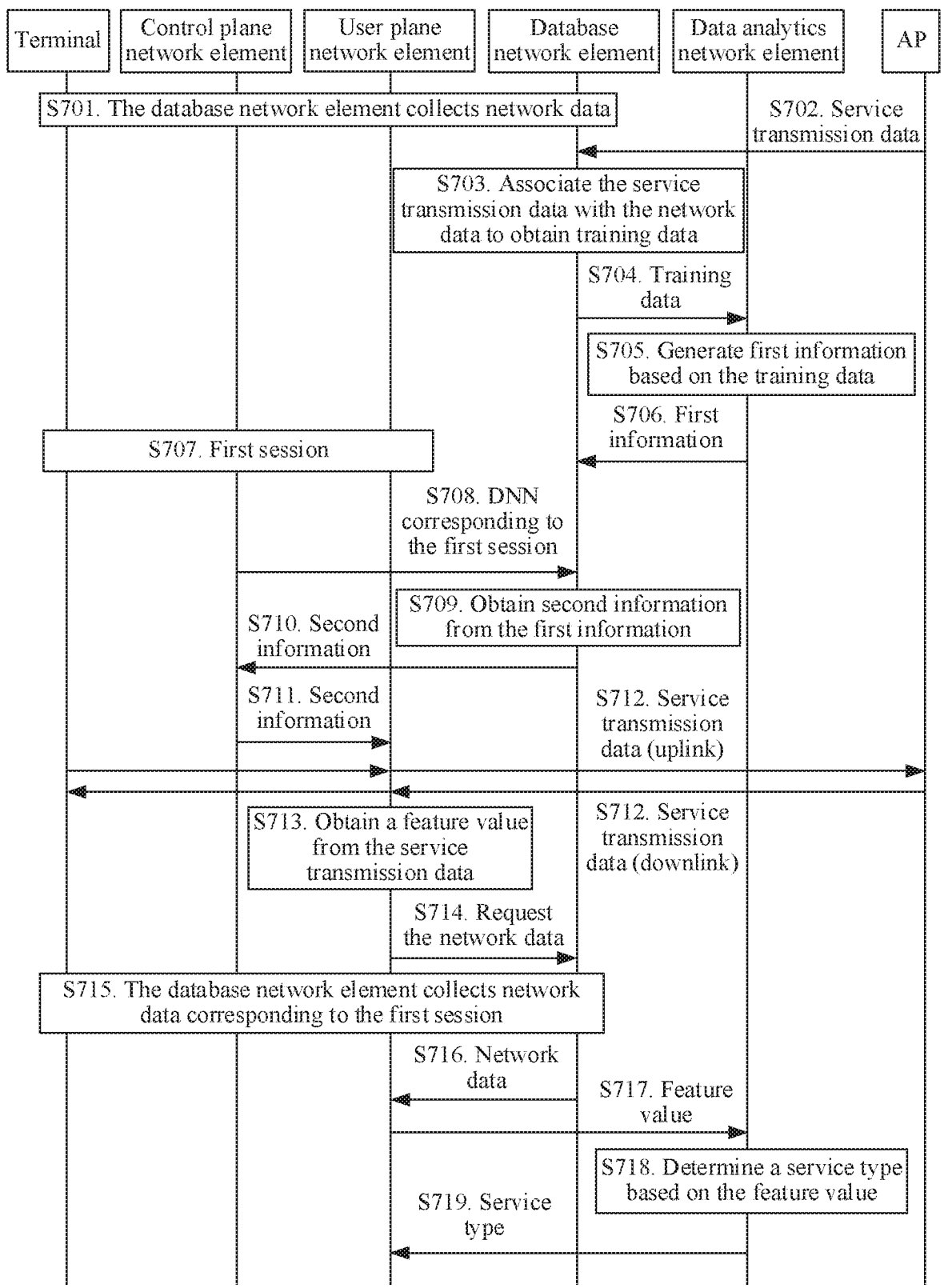
FIG. 7 is a schematic interaction flowchart of a communication method according to another embodiment of this application.

FIG. 7 is a schematic interactive flowchart of a communication method according to an embodiment of this application. It should be understood that, although steps or operations of the communication method are shown in FIG. 7, the steps or operations are merely an example, and other operations or variations of the operations in FIG. 7 may also be performed in this embodiment of this application. In addition, the steps in FIG. 7 may be performed in a sequence different from that presented in FIG. 7, and not all the operations in FIG. 7 may be performed.

For steps S701 to S713, refer to steps S501 to S513 in FIG. 5. For brevity, details are not described herein again.

For steps S714 to S716, refer to steps S413 to S415 in FIG. 4. For brevity, details are not described herein again.

For steps S717 to S719, refer to steps S517 to S519 in FIG. 5. For brevity, details are not described herein again.

In the communication method shown in FIG. 2, optionally, when application data on an application platform changes, for example, when a version of an application is upgraded, the database network element may re-perform steps S201 to S207.

In the communication method shown in FIG. 3, optionally, when application data on an application platform changes, for example, when a version of an application is upgraded, the database network element may re-perform steps S301 to S307.

In the communication method shown in FIG. 4, optionally, when application data on an application platform changes, for example, when a version of an application is upgraded, the database network element may re-perform steps S401 to S407.

In the communication method shown in FIG. 5, optionally, when application data on an application platform changes, for example, when a version of an application is upgraded, the database network element may re-perform steps S501 to S506.

In the communication method shown in FIG. 6, optionally, when application data on an application platform changes, for example, when a version of an application is upgraded, the database network element may re-perform steps S601 to S606.

In the communication method shown in FIG. 7, optionally, when application data on an application platform changes, for example, when a version of an application is upgraded, the database network element may re-perform steps S701 to S706.

The foregoing describes the schematic interaction flowcharts of the communication method in the embodiments of this application with reference to FIG. 2 to FIG. 7. The following describes a communication method on a single side in the embodiments of this application with reference to FIG. 8 to FIG. 13.

Figure 8:
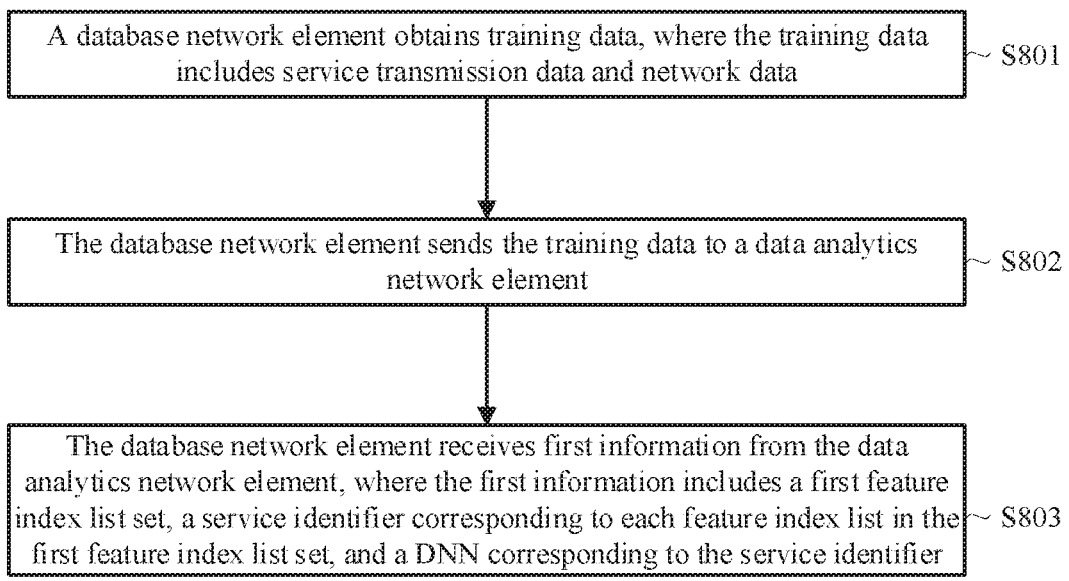
FIG. 8 is a schematic flowchart of a communication method according to an embodiment of this application.

FIG. 8 is a schematic flowchart of a communication method according to an embodiment of this application. It should be understood that, although steps or operations of the communication method are shown in FIG. 8, the steps or operations are merely an example, and other operations or variations of the operations in FIG. 8 may also be performed in this embodiment of this application. In addition, the steps in FIG. 8 may be performed in a sequence different from that presented in FIG. 8, and not all the operations in FIG. 8 may be performed.

S801. A database network element obtains training data, where the training data includes service transmission data and network data.

For details, for example, refer to step S201 to step S203 in FIG. 2, step S301 to step S303 in FIG. 3, step S401 to step S403 in FIG. 4, step S501 to step S503 in FIG. 5, step 601 to step 603 in FIG. 6, or step S701 to step S703 in FIG. 7.

S802. The database network element sends the training data to a data analytics network element.

For details, for example, refer to step S204 in FIG. 2, step S304 in FIG. 3, step S404 in FIG. 4, step S504 in FIG. 5, step S604 in FIG. 6, or step S704 in FIG. 7.

S803. The database network element receives first information from the data analytics network element, where the first information includes a first feature index list set, a service identifier corresponding to each feature index list in the first feature index list set, and a DNN corresponding to the service identifier.

For details, for example, refer to step S206 in FIG. 2, step S306 in FIG. 3, step S406 in FIG. 4, step S506 in FIG. 5, step S606 in FIG. 6, or step S706 in FIG. 7.

Optionally, the communication method shown in FIG. 8 may further include: sending, by the database network element, the first information to a control plane network element.

For details, for example, refer to step S207 in FIG. 2, step S307 in FIG. 3 or step S407 in FIG. 4.

Optionally, the communication method shown in FIG. 8 may further include: receiving, by the database network element from the control plane network element, a DNN corresponding to a first session; querying, by the database network element, the first information based on the DNN corresponding to the first session, to obtain second information, where the second information includes a second feature index list set corresponding to the DNN corresponding to the first session and a service identifier corresponding to each feature index list in the second feature index list set; and sending, by the database network element, the second information to the control plane network element.

For details, for example, refer to step S509 in FIG. 5, step S609 in FIG. 6 or step S709 in FIG. 7.

Optionally, the communication method shown in FIG. 8 may further include: receiving, by the database network element, third information from a user plane network element, where the third information includes a first service identifier set; querying, by the database network element, the first information to obtain a feature index list corresponding to each service identifier in the first service identifier set; querying, by the database network element, the network data based on the feature index list corresponding to each service identifier in the first service identifier set, to obtain a network data eigenvalue list corresponding to each service identifier in the first service identifier set; and sending, by the database network element, the network data eigenvalue list corresponding to each service identifier in the first service identifier set to the user plane network element.

For details, for example, refer to steps S213 to S215 in FIG. 2 or steps S514 to S516 in FIG. 5.

Figure 9:
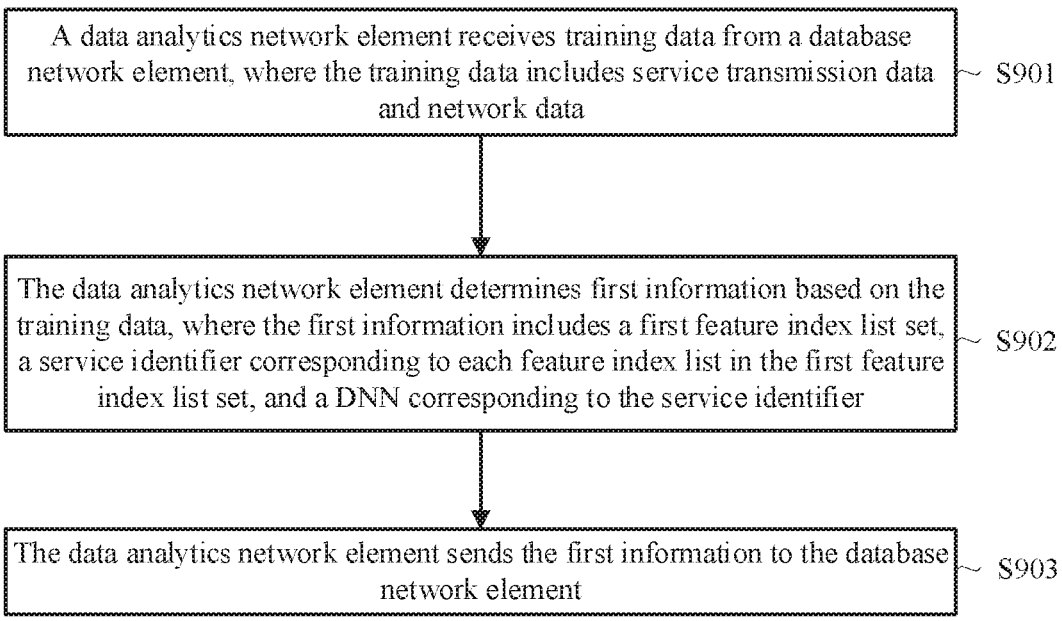
FIG. 9 is a schematic flowchart of a communication method according to another embodiment of this application.

FIG. 9 is a schematic flowchart of a communication method according to an embodiment of this application. It should be understood that, although steps or operations of the communication method are shown in FIG. 9, the steps or operations are merely an example, and other operations or variations of the operations in FIG. 9 may also be performed in this embodiment of this application. In addition, the steps in FIG. 9 may be performed in a sequence different from that presented in FIG. 9, and not all the operations in FIG. 9 may be performed.

S901. A data analytics network element receives training data from a database network element, where the training data includes service transmission data and network data.

For details, for example, refer to step S204 in FIG. 2, step S304 in FIG. 3, step S404 in FIG. 4, step S504 in FIG. 5, step S604 in FIG. 6, or step S704 in FIG. 7.

S902. The data analytics network element determines first information based on the training data, where the first information includes a first feature index list set, a service identifier corresponding to each feature index list in the first feature index list set, and a DNN corresponding to the service identifier.

For details, for example, refer to step S205 in FIG. 2, step S305 in FIG. 3, step S405 in FIG. 4, step S505 in FIG. 5, step S605 in FIG. 6, or step S705 in FIG. 7.

S903. The data analytics network element sends the first information to the database network element.

For details, for example, refer to step S206 in FIG. 2, step S306 in FIG. 3, step S406 in FIG. 4, step S506 in FIG. 5, step S606 in FIG. 6, or step S706 in FIG. 7.

Figure 10:
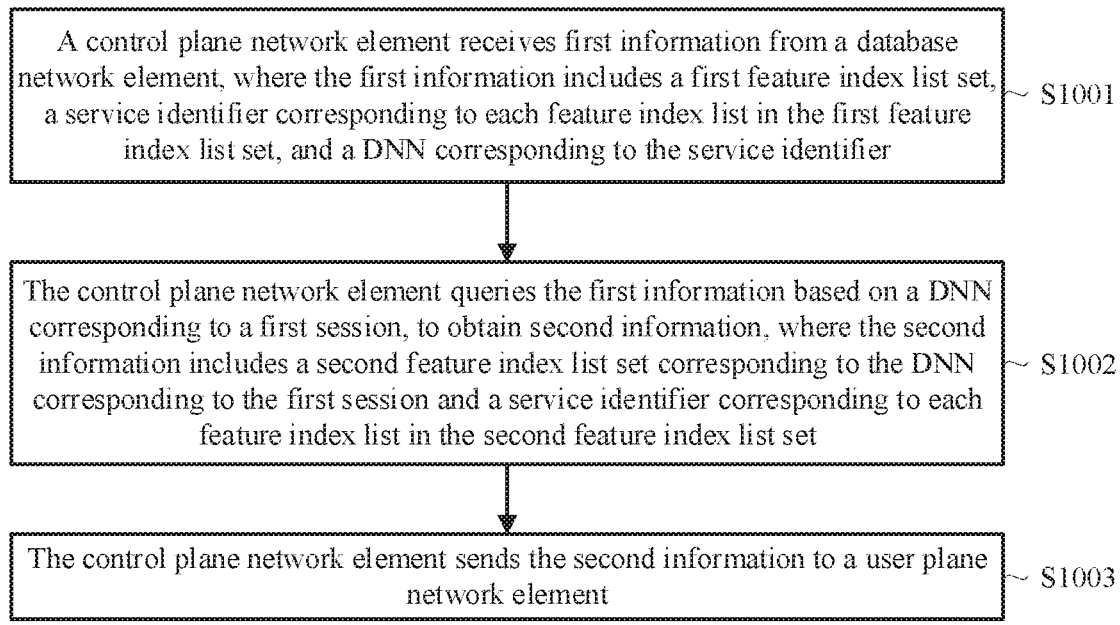
FIG. 10 is a schematic flowchart of a communication method according to another embodiment of this application.

FIG. 10 is a schematic flowchart of a communication method according to an embodiment of this application. It should be understood that, although steps or operations of the communication method are shown in FIG. 10, the steps or operations are merely an example, and other operations or variations of the operations in FIG. 10 may also be performed in this embodiment of this application. In addition, the steps in FIG. 10 may be performed in a sequence different from that presented in FIG. 10, and not all the operations in FIG. 10 may be performed.

S1001. A control plane network element receives first information from a database network element, where the first information includes a first feature index list set, a service identifier corresponding to each feature index list in the first feature index list set, and a DNN corresponding to the service identifier.

For details, for example, refer to step S207 in FIG. 2, step S307 in FIG. 3, or step S407 in FIG. 4.

S1002. The control plane network element queries the first information based on a DNN corresponding to a first session, to obtain second information, where the second information includes a second feature index list set corresponding to the DNN corresponding to the first session and a service identifier corresponding to each feature index list in the second feature index list set.

For details, for example, refer to step S209 in FIG. 2, step S309 in FIG. 3, or step S409 in FIG. 4.

S1003. The control plane network element sends the second information to a user plane network element.

For details, for example, refer to step S210 in FIG. 2, step S310 in FIG. 3, or step S410 in FIG. 4.

Figure 11:
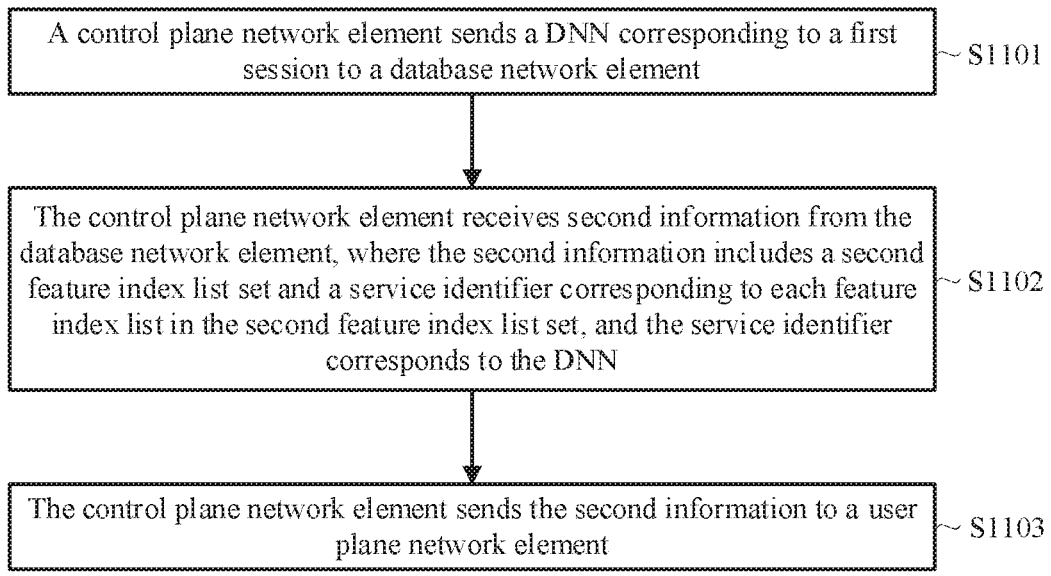
FIG. 11 is a schematic flowchart of a communication method according to another embodiment of this application.

FIG. 11 is a schematic flowchart of a communication method according to an embodiment of this application. It should be understood that, although steps or operations of the communication method are shown in FIG. 11, the steps or operations are merely an example, and other operations or variations of the operations in FIG. 11 may also be performed in this embodiment of this application. In addition, the steps in FIG. 11 may be performed in a sequence different from that presented in FIG. 11, and not all the operations in FIG. 11 may be performed.

S1101. A control plane network element sends a DNN corresponding to a first session to a database network element.

For details, for example, refer to step S508 in FIG. 5, step S608 in FIG. 6, or step S708 in FIG. 7.

S1102. The control plane network element receives second information from the database network element, where the second information includes a second feature index list set and a service identifier corresponding to each feature index list in the second feature index list set, and the service identifier corresponds to the DNN.

For details, for example, refer to step S510 in FIG. 5, step S610 in FIG. 6, or step S710 in FIG. 7.

S1103. The control plane network element sends the second information to a user plane network element.

For details, for example, refer to step S511 in FIG. 5, step S611 in FIG. 6, or step S711 in FIG. 7.

Optionally, before the control plane network element receives the second information from the database network element, the communication method may further include: sending, by the control plane network element to the database network element, at least one of the following information corresponding to the first session: a network slice type, an SSC mode, and a PDU session type.

Figure 12:
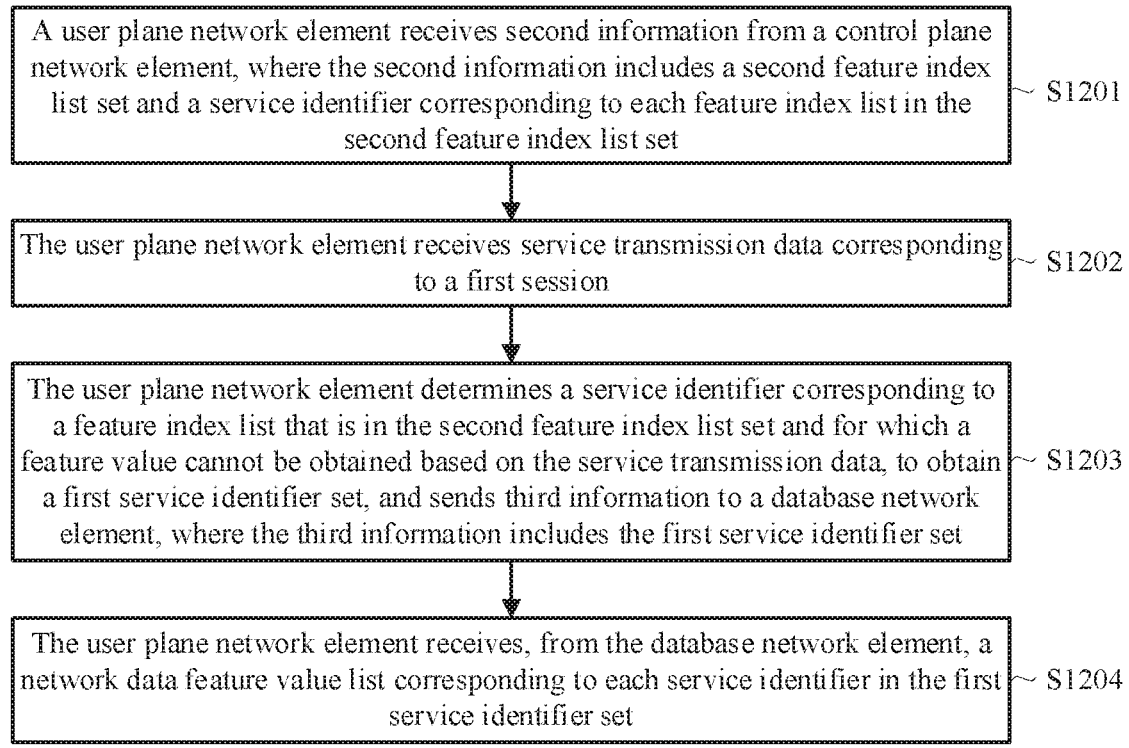
FIG. 12 is a schematic flowchart of a communication method according to another embodiment of this application.

FIG. 12 is a schematic flowchart of a communication method according to an embodiment of this application. It should be understood that, although steps or operations of the communication method are shown in FIG. 12, the steps or operations are merely an example, and other operations or variations of the operations in FIG. 12 may also be performed in this embodiment of this application. In addition, the steps in FIG. 12 may be performed in a sequence different from that presented in FIG. 12, and not all the operations in FIG. 12 may be performed.

S1201. A user plane network element receives second information from a control plane network element, where the second information includes a second feature index list set and a service identifier corresponding to each feature index list in the second feature index list set.

For details, for example, refer to step S210 in FIG. 2 or step S511 in FIG. 5.

S1202. The user plane network element receives service transmission data corresponding to a first session.

For details, for example, refer to step S211 in FIG. 2 or step S512 in FIG. 5.

S1203. The user plane network element determines a service identifier corresponding to a feature index list that is in the second feature index list set and for which an eigenvalue cannot be obtained based on the service transmission data, to obtain a first service identifier set, and sends third information to a database network element, where the third information includes the first service identifier set.

For details, for example, refer to step S213 in FIG. 2 or step S514 in FIG. 5.

S1204. The user plane network element receives, from the database network element, a network data eigenvalue list corresponding to each service identifier in the first service identifier set.

For details, for example, refer to step S215 in FIG. 2 or step S516 in FIG. 5.

Figure 13:
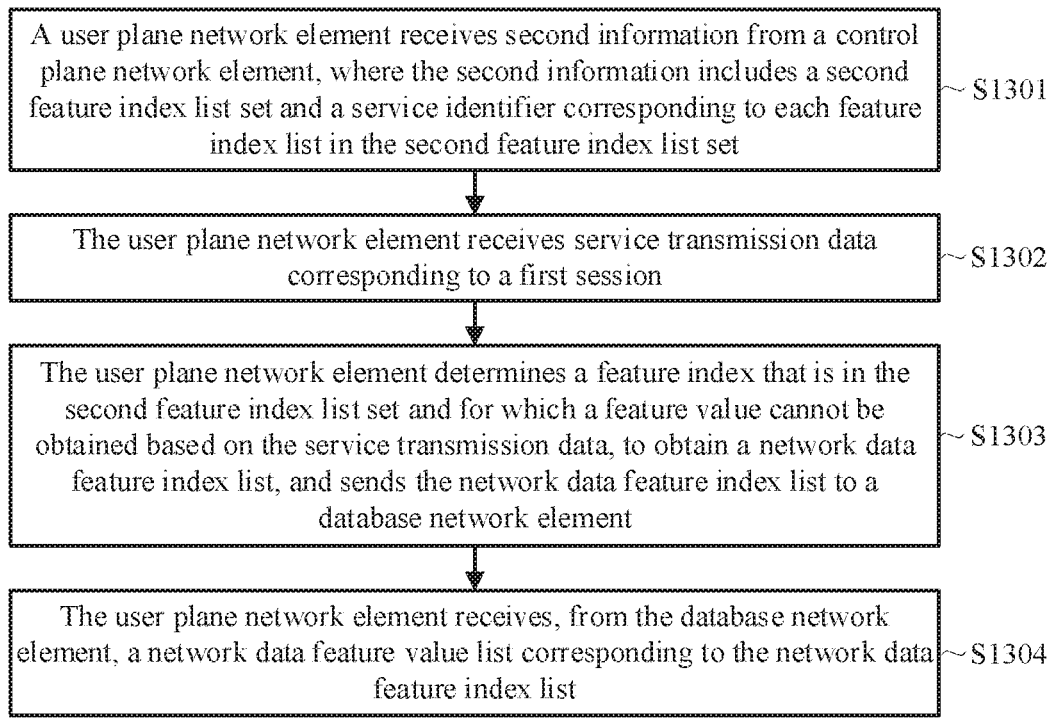
FIG. 13 is a schematic flowchart of a communication method according to another embodiment of this application.

FIG. 13 is a schematic flowchart of a communication method according to an embodiment of this application. It should be understood that, although steps or operations of the communication method are shown in FIG. 13, the steps or operations are merely an example, and other operations or variations of the operations in FIG. 13 may also be performed in this embodiment of this application. In addition, the steps in FIG. 13 may be performed in a sequence different from that presented in FIG. 13, and not all the operations in FIG. 13 may be performed.

S1301. A user plane network element receives second information from a control plane network element, where the second information includes a second feature index list set and a service identifier corresponding to each feature index list in the second feature index list set.

For details, for example, refer to step S310 in FIG. 3 or step S611 in FIG. 6.

S1302. The user plane network element receives service transmission data corresponding to a first session.

For details, for example, refer to step S311 in FIG. 3 or step S612 in FIG. 6.

S1303. The user plane network element determines a feature index that is in the second feature index list set and for which an eigenvalue cannot be obtained based on the service transmission data, to obtain a network data feature index list, and sends the network data feature index list to a database network element.

For details, for example, refer to step S313 in FIG. 3 or step S614 in FIG. 6.

S1304. The user plane network element receives, from the database network element, a network data eigenvalue list corresponding to the network data feature index list.

For details, for example, refer to step S315 in FIG. 3 or step S616 in FIG. 6.

Figure 14:
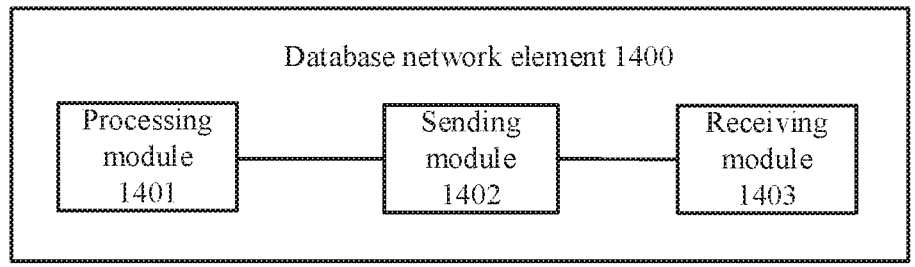
FIG. 14 is a schematic structural diagram of a database network element according to an embodiment of this application.

FIG. 14 is a schematic structural diagram of a database network element according to an embodiment of this application. It should be understood that the database network element 1400 shown in FIG. 14 is merely an example. The database network element in this embodiment of this application may further include other modules or units, or include modules having functions similar to those of modules in FIG. 14, or not include all modules in FIG. 14.

A processing module 1401 is configured to obtain training data, where the training data includes service transmission data and network data.

A sending module 1402 is configured to send the training data to a data analytics network element.

A receiving module 1403 is configured to receive first information from the data analytics network element, where the first information includes a first feature index list set, a service identifier corresponding to each feature index list in the first feature index list set, and a data network name DNN corresponding to the service identifier.

Optionally, the first information may further include at least one of the following information corresponding to each feature index list in the first feature index list set: a network slice type, an SSC mode, and a PDU session type.

Optionally, the sending module 1402 may be further configured to send the first information to a control plane network element.

Optionally, the receiving module may be further configured to receive, from the control plane network element, a DNN corresponding to a first session.

Correspondingly, the processing module 1401 is further configured to query the first information based on the DNN corresponding to the first session, to obtain second information, where the second information includes a second feature index list set corresponding to the DNN corresponding to the first session and a service identifier corresponding to each feature index list in the second feature index list set.

The sending module is further configured to send the second information to the control plane network element.

Optionally, the receiving module 1403 may be further configured to receive, from the control plane network element, at least one of the following information corresponding to the first session: a network slice type, an SSC mode, and a PDU session type.

Correspondingly, the processing module 1401 is specifically configured to query the first information based on the DNN corresponding to the first session and the at least one of the information corresponding to the first session, to obtain the second information.

Optionally, the receiving module 1403 may be further configured to receive third information from a user plane network element, where the third information includes a first service identifier set.

Correspondingly, the processing module 1401 is further configured to:

query the first information to obtain a feature index list corresponding to each service identifier in the first service identifier set; and query the network data based on the feature index list corresponding to each service identifier in the first service identifier set, to obtain a network data eigenvalue list corresponding to each service identifier in the first service identifier set.

The sending module 1402 is further configured to send the network data eigenvalue list corresponding to each service identifier in the first service identifier set to the user plane network element.

Optionally, the third information may further include at least one of the following information: a time at which the user plane network element receives service transmission data corresponding to the first session, a session identifier of the first session, an identifier of a terminal corresponding to the first session, an internet protocol IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

It should be understood that the modules included in the database network element 1400 in FIG. 14 may be configured to implement corresponding steps performed by the database network element in any of the communication methods shown in FIG. 2 to FIG. 7. For brevity, details are not described herein again.

Figure 15:
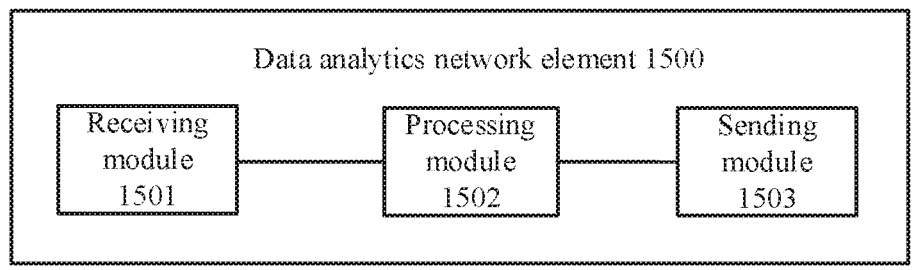
FIG. 15 is a schematic structural diagram of a data analytics network element according to an embodiment of this application.

FIG. 15 is a schematic structural diagram of a data analytics network element according to an embodiment of this application. It should be understood that the data analytics network element 1500 shown in FIG. 15 is merely an example. The data analytics network element in this embodiment of this application may further include other modules or units, or include modules having functions similar to those of modules in FIG. 15, or not include all modules in FIG. 15.

A receiving module 1501 is configured to receive training data from a database network element, where the training data includes service transmission data and network data.

A processing module 1502 is configured to determine first information based on the training data, where the first information includes a first feature index list set, a service identifier corresponding to each feature index list in the first feature index list set, and a DNN corresponding to the service identifier.

A sending module 1503 is configured to send the first information to the database network element.

Optionally, the first information may further include at least one of the following information corresponding to each feature index list in the first feature index list set: a network slice type, an SSC mode, and a PDU session type.

It should be understood that the modules included in the data analytics network element 1500 in FIG. 15 may be configured to implement corresponding steps performed by the data analytics network element in any of the communication methods shown in FIG. 2 to FIG. 7. For brevity, details are not described herein again.

Figure 16:
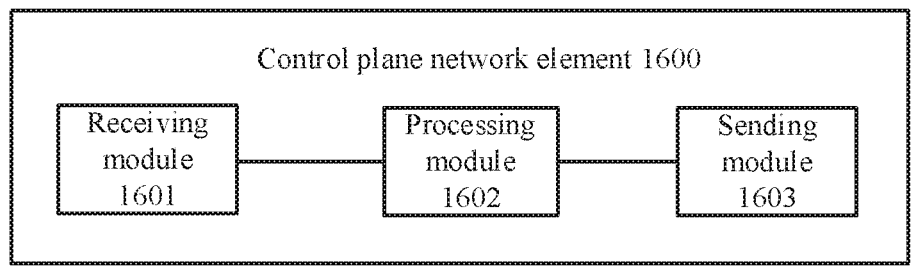
FIG. 16 is a schematic structural diagram of a control plane network element according to an embodiment of this application.

FIG. 16 is a schematic structural diagram of a control plane network element according to an embodiment of this application. It should be understood that the control plane network element 1600 shown in FIG. 16 is merely an example. The control plane network element in this embodiment of this application may further include other modules or units, or include modules having functions similar to those of modules in FIG. 16, or not include all modules in FIG. 16.

A receiving module 1601 is configured to receive first information from a database network element, where the first information includes a first feature index list set, a service identifier corresponding to each feature index list in the first feature index list set, and a DNN corresponding to the service identifier.

A processing module 1602 is configured to query the first information based on a DNN corresponding to a first session, to obtain second information, where the second information includes a second feature index list set corresponding to the DNN corresponding to the first session and a service identifier corresponding to each feature index list in the second feature index list.

A sending module 1603 is configured to send the second information to a user plane network element.

Optionally, the first information may further include at least one of the following information corresponding to each feature index list in the first feature index list set: a network slice type, an SSC mode, and a PDU session type.

Correspondingly, the processing module 1602 is specifically configured to query the first information based on the DNN corresponding to the first session and at least one of a network slice type, an SSC mode, and a PDU session type that correspond to the first session, to obtain the second information.

It should be understood that the modules included in the control plane network element 1600 in FIG. 16 may be configured to implement corresponding steps performed by the control plane network element in the communication method shown in FIG. 2, FIG. 3, or FIG. 4. For brevity, details are not described herein again.

Figure 17:
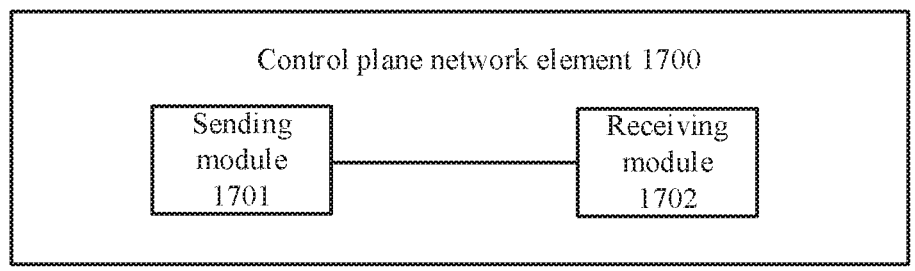
FIG. 17 is a schematic structural diagram of a control plane network element according to another embodiment of this application.

FIG. 17 is a schematic structural diagram of a control plane network element according to an embodiment of this application. It should be understood that the control plane network element 1700 shown in FIG. 17 is merely an example. The control plane network element in this embodiment of this application may further include other modules or units, or include modules having functions similar to those of modules in FIG. 17, or not include all modules in FIG. 17.

A sending module 1701 is configured to send a DNN corresponding to a first session to a database network element.

A receiving module 1702 is configured to receive second information from the database network element, where the second information includes a second feature index list set and a service identifier corresponding to each feature index list in the second feature index list set, and the service identifier corresponds to the DNN corresponding to the first session.

The sending module 1701 is further configured to send the second information to a user plane network element.

Optionally, the sending module 1701 is further configured to send, to the database network element, at least one of the following information corresponding to the first session: a network slice type, an SSC mode, and a PDU session type.

It should be understood that the modules included in the control plane network element 1700 in FIG. 17 may be configured to implement corresponding steps performed by the control plane network element in the communication method shown in FIG. 5, FIG. 6, or FIG. 7. For brevity, details are not described herein again.

Figure 18:
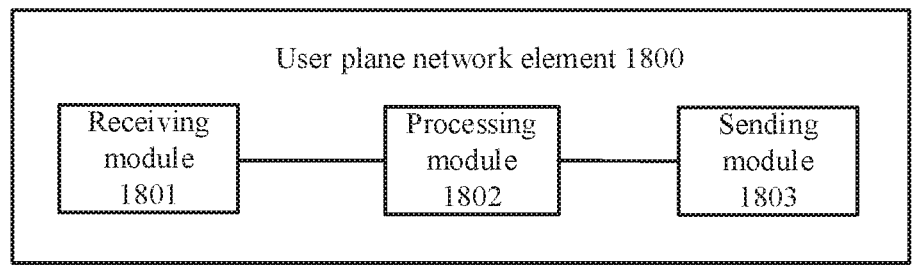
FIG. 18 is a schematic structural diagram of a user plane network element according to an embodiment of this application.

FIG. 18 is a schematic structural diagram of a user plane network element according to an embodiment of this application. It should be understood that the user plane network element 1800 shown in FIG. 18 is merely an example. The user plane network element in this embodiment of this application may further include other modules or units, or include modules having functions similar to those of modules in FIG. 18, or not include all modules in FIG. 18.

A receiving module 1801 is configured to receive second information from a control plane network element, where the second information includes a second feature index list set and a service identifier corresponding to each feature index list in the second feature index list set.

The receiving module 1801 is further configured to receive service transmission data corresponding to a first session.

A processing module 1802 is configured to determine a service identifier corresponding to a feature index list that is in the second feature index list set and for which an eigenvalue cannot be obtained based on the service transmission data, to obtain a first service identifier set.

A sending module 1803 is configured to send third information to a database network element, where the third information includes the first service identifier set.

The receiving module 1801 is further configured to receive, from the database network element, a network data eigenvalue list corresponding to each service identifier in the first service identifier set.

Optionally, the third information further includes at least one of the following information: a time at which the user plane network element receives the service transmission data corresponding to the first session, a session identifier of the first session, an identifier of a terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

It should be understood that the modules included in the user plane network element 1800 in FIG. 18 may be configured to implement corresponding steps performed by the user plane network element in the communication method shown in FIG. 2 or FIG. 5. For brevity, details are not described herein again.

Figure 19:
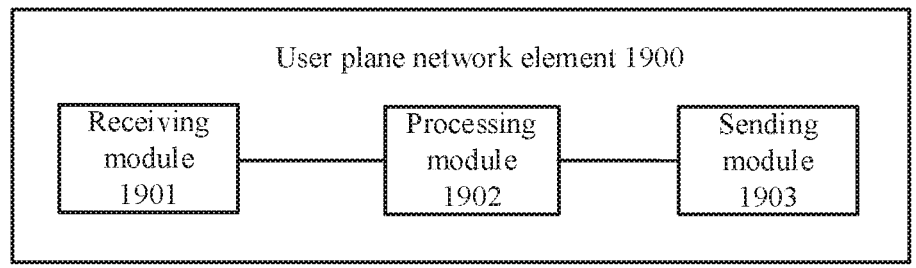
FIG. 19 is a schematic structural diagram of a user plane network element according to another embodiment of this application.

FIG. 19 is a schematic structural diagram of a user plane network element according to an embodiment of this application. It should be understood that the user plane network element 1900 shown in FIG. 19 is merely an example. The user plane network element in this embodiment of this application may further include other modules or units, or include modules having functions similar to those of modules in FIG. 19, or not include all modules in FIG. 19.

A receiving module 1901 is configured to receive second information from a control plane network element, where the second information includes a second feature index list set and a service identifier corresponding to each feature index list in the second feature index list set.

The receiving module 1901 is further configured to receive service transmission data corresponding to a first session.

A processing module 1902 is configured to determine a feature index that is in the second feature index list set and for which an eigenvalue cannot be obtained based on the service transmission data, to obtain a network data feature index list.

A sending module 1903 is configured to send the network data feature index list to a database network element.

The receiving module 1901 is further configured to receive, from the database network element, a network data eigenvalue list corresponding to the network data feature index list.

Optionally, third information may include at least one of the following information: a time at which the user plane network element receives the service transmission data corresponding to the first session, a session identifier of the first session, an identifier of a terminal corresponding to the first session, an IP address of the terminal corresponding to the first session, a port on the terminal corresponding to the first session, an IP address of a service server corresponding to the first session, a port that is on the service server and that corresponds to the first session, and a service transmission protocol for the service data corresponding to the first session.

It should be understood that the modules included in the user plane network element 1900 in FIG. 19 may be configured to implement corresponding steps performed by the user plane network element in the communication method shown in FIG. 3 or FIG. 6. For brevity, details are not described herein again.

Figure 20:
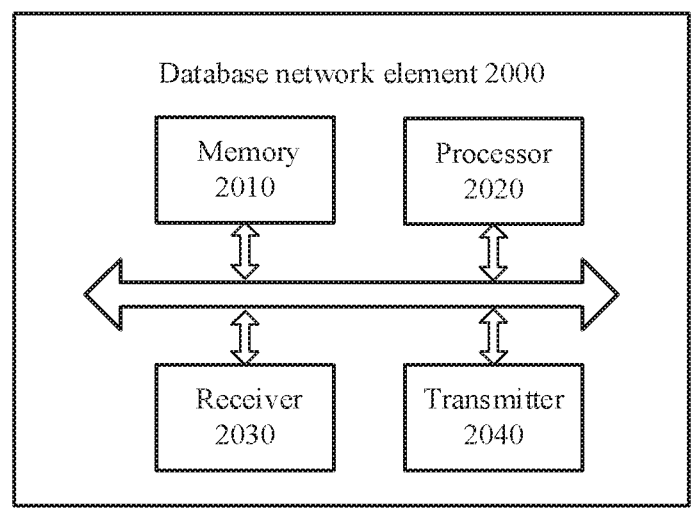
FIG. 20 is a schematic structural diagram of a database network element according to another embodiment of this application.

FIG. 20 is a schematic structural diagram of a database network element according to an embodiment of this application. It should be understood that the database network element 2000 shown in FIG. 20 is merely an example. The database network element in this embodiment of this application may further include other modules or units, or include modules having functions similar to those of modules in FIG. 20, or not include all modules in FIG. 20.

A processor 2020 may be configured to implement an operation or a step performed by the processing module 1401 in FIG. 14. A transmitter 2040 may be configured to implement an operation or a step performed by the sending module 1402 in FIG. 14. A receiver 2030 may be configured to implement an operation or a step performed by the receiving module 1403 in FIG. 14.

The receiver 2030 and the transmitter 2040 may be integrated together and collectively referred to as a transceiver.

Optionally, the database network element 2000 may further include a memory 2010, configured to store program code executed by the processor 2020. The memory may be integrated into the processor 2020.

Figure 21:
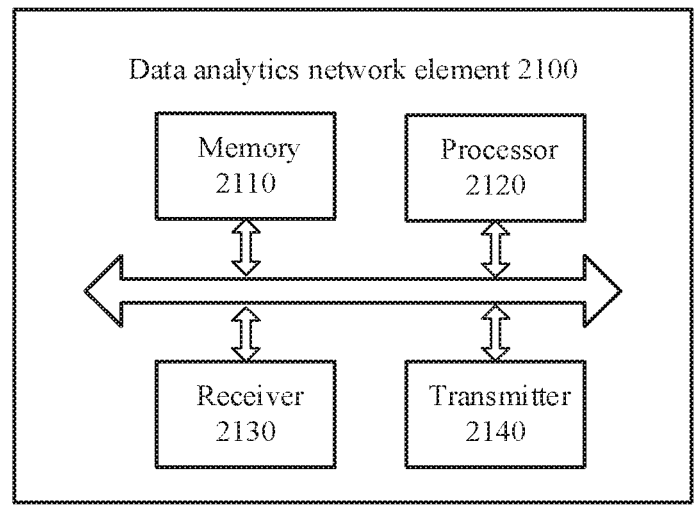
FIG. 21 is a schematic structural diagram of a data analytics network element according to another embodiment of this application.

FIG. 21 is a schematic structural diagram of a data analytics network element according to an embodiment of this application. It should be understood that the data analytics network element 2100 shown in FIG. 21 is merely an example. The data analytics network element in this embodiment of this application may further include other modules or units, or include modules having functions similar to those of modules in FIG. 21, or not include all modules in FIG. 21.

A processor 2120 may be configured to implement an operation or a step performed by the processing module 1502 in FIG. 15. A transmitter 2140 may be configured to implement an operation or a step performed by the sending module 1503 in FIG. 15. A receiver 2130 may be configured to implement an operation or a step performed by the receiving module 1501 in FIG. 15.

The receiver 2130 and the transmitter 2140 may be integrated together and collectively referred to as a transceiver.

Optionally, the data analytics network element 2100 may further include a memory 2110, configured to store program code executed by the processor 2120. The memory may be integrated into the processor 2120.

Figure 22:
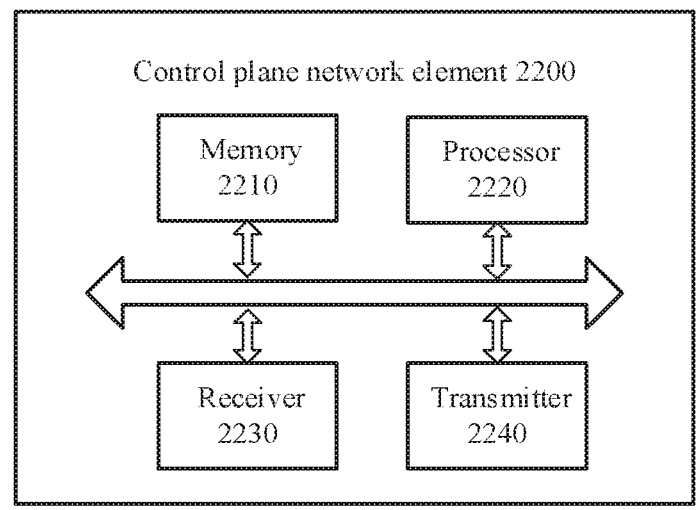
FIG. 22 is a schematic structural diagram of a control plane network element according to another embodiment of this application.

FIG. 22 is a schematic structural diagram of a control plane network element according to an embodiment of this application. It should be understood that the control plane network element 2200 shown in FIG. 22 is merely an example. The control plane network element in this embodiment of this application may further include other modules or units, or include modules having functions similar to those of modules in FIG. 22, or not include all modules in FIG. 22.

A processor 2220 may be configured to implement an operation or a step performed by the processing module 1602 in FIG. 16. A transmitter 2240 may be configured to implement an operation or a step performed by the sending module 1603 in FIG. 16. A receiver 2230 may be configured to implement an operation or a step performed by the receiving module 1601 in FIG. 16.

The receiver 2230 and the transmitter 2240 may be integrated together and collectively referred to as a transceiver.

Optionally, the control plane network element 2200 may further include a memory 2210, configured to store program code executed by the processor 2220. The memory may be integrated into the processor 2220.

Figure 23:
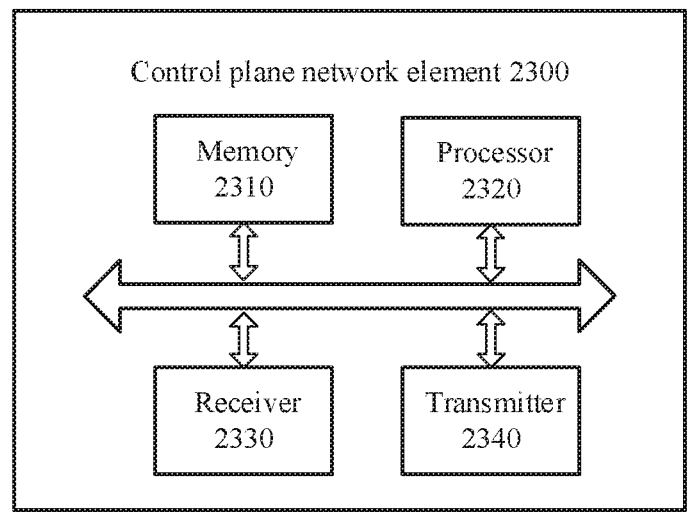
FIG. 23 is a schematic structural diagram of a control plane network element according to another embodiment of this application.

FIG. 23 is a schematic structural diagram of a control plane network element according to an embodiment of this application. It should be understood that the control plane network element 2300 shown in FIG. 23 is merely an example. The control plane network element in this embodiment of this application may further include other modules or units, or include modules having functions similar to those of modules in FIG. 23, or not include all modules in FIG. 23.

A transmitter 2340 may be configured to implement an operation or a step performed by the sending module 1701 in FIG. 17. A receiver 2330 may be configured to implement an operation or a step performed by the receiving module 1702 in FIG. 17.

The receiver 2330 and the transmitter 2340 may be integrated together and collectively referred to as a transceiver.

Optionally, the control plane network element 2300 may further include a memory 2310 and a processor 2320. The memory 2310 is configured to store program code, and the processor 2320 is configured to execute the program code stored in the memory 2310.

The memory 2310 may be integrated into the processor 2320.

Figure 24:
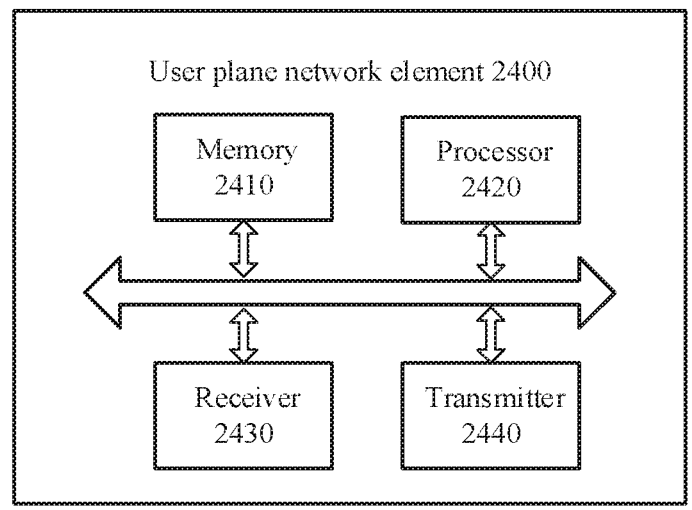
FIG. 24 is a schematic structural diagram of a user plane network element according to another embodiment of this application.

FIG. 24 is a schematic structural diagram of a user plane network element according to an embodiment of this application. It should be understood that the user plane network element 2400 shown in FIG. 24 is merely an example. The user plane network element in this embodiment of this application may further include other modules or units, or include modules having functions similar to those of modules in FIG. 24, or not include all modules in FIG. 24.

A processor 2420 may be configured to implement an operation or a step performed by the processing module 1802 in FIG. 18. A transmitter 2440 may be configured to implement an operation or a step performed by the sending module 1803 in FIG. 18. A receiver 2430 may be configured to implement an operation or a step performed by the receiving module 1801 in FIG. 18.

The receiver 2430 and the transmitter 2440 may be integrated together and collectively referred to as a transceiver.

Optionally, the user plane network element 2400 may further include a memory 2410, configured to store program code executed by the processor 2420. The memory may be integrated into the processor 2420.

Figure 25:
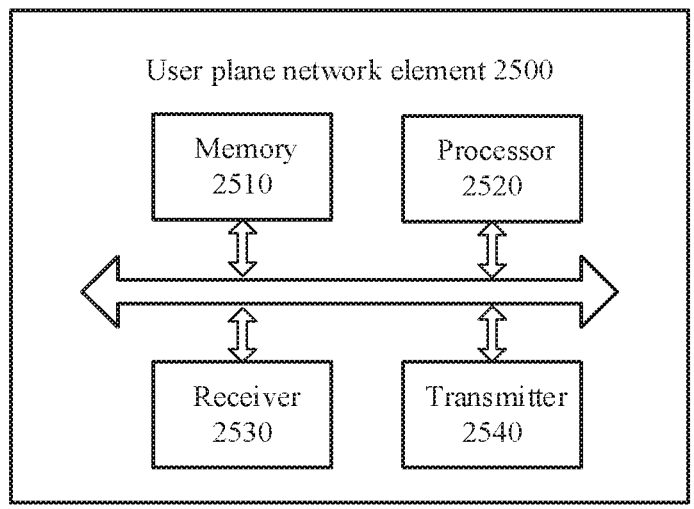
FIG. 25 is a schematic structural diagram of a user plane network element according to another embodiment of this application.

FIG. 25 is a schematic structural diagram of a user plane network element according to an embodiment of this application. It should be understood that the user plane network element 2500 shown in FIG. 25 is merely an example. The user plane network element in this embodiment of this application may further include other modules or units, or include modules having functions similar to those of modules in FIG. 25, or not include all modules in FIG. 25.

A processor 2520 may be configured to implement an operation or a step performed by the processing module 1902 in FIG. 19. A transmitter 2540 may be configured to implement an operation or a step performed by the sending module 1903 in FIG. 19. A receiver 2530 may be configured to implement an operation or a step performed by the receiving module 1901 in FIG. 19.

The receiver 2530 and the transmitter 2540 may be integrated together and collectively referred to as a transceiver.

Optionally, the user plane network element 2500 may further include a memory 2510, configured to store program code executed by the processor 2520. The memory may be integrated into the processor 2520.

Figure 26:
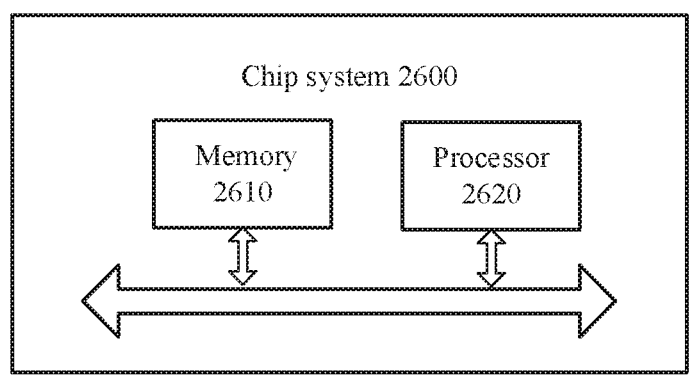
FIG. 26 is a schematic structural diagram of a chip system according to an embodiment of this application.

FIG. 26 is a schematic structural diagram of a chip system according to an embodiment of this application. It should be understood that the chip system 2600 shown in FIG. 26 is merely an example. The chip system in this embodiment of this application may further include other modules or units, or include modules having functions similar to those of modules in FIG. 26, or not include all modules in FIG. 26.

The chip system 2600 includes a processor 2620, configured to support the database network element, the data analytics network element, the control plane network element, or the user plane network element in implementing functions described in the corresponding communication method, for example, generating or processing information related to the communication method.

The chip system 2600 may include one or more processors 2620. This is not limited in this application.

Optionally, the chip system 2600 further includes a memory 2610. The memory 2610 is configured to store a program instruction and data necessary for the database network element, the data analytics network element, the control plane network element, or the user plane network element. The chip system may include a chip, or may include a chip and another discrete device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:
    obtaining, by a database network element, training data, wherein the training data comprises service transmission data and network data;
    sending, by the database network element, the training data to a data analytics network element;

receiving, by the data analytics network element, the training data from the database network element;

determining, by the data analytics network element, first information based on the training data, wherein the first information comprises a first feature index list set, a service identifier corresponding to each feature index list in the first feature index list set, and a data network name (DNN) corresponding to the service identifier;

sending, by the data analytics network element, the first information to the database network element; and receiving, by the database network element, the first information from the data analytics network element.

2. The communication method according to claim 1, wherein the first information further comprises at least one of the following information corresponding to each feature index list in the first feature index list set: a network slice type, a session and service continuity (SSC) mode, and a packet data unit (PDU) session type.

3. The communication method according to claim 1, wherein the communication method further comprises:
sending, by the database network element, the first information to a control plane network element.

4. The communication method according to claim 1, wherein the communication method further comprises:
receiving, by the database network element from a control plane network element, a DNN corresponding to a first session;
querying, by the database network element, the first information based on the DNN corresponding to the first session, to obtain second information, wherein the second information comprises a second feature index list set corresponding to the DNN corresponding to the first session and a service identifier corresponding to each feature index list in the second feature index list set; and
sending, by the database network element, the second information to the control plane network element.

5. The communication method according to claim 4, wherein the communication method further comprises:
receiving, by the database network element from the control plane network element, at least one of the following information corresponding to the first session: a network slice type, an SSC mode, and a PDU session type; and
wherein the querying, by the database network element, the first information based on the DNN corresponding to the first session, to obtain second information comprises querying, by the database network element, the first information based on the DNN corresponding to the first session and the at least one of the information corresponding to the first session, to obtain the second information.

6. The communication method according to claim 1, wherein the communication method further comprises:
receiving, by the database network element, third information from a user plane network element, wherein the third information comprises a first service identifier set;
querying, by the database network element, the first information to obtain a feature index list corresponding to each service identifier in the first service identifier set;
querying, by the database network element, the network data based on the feature index list corresponding to each service identifier in the first service identifier set, to obtain a network data eigenvalue list corresponding to each service identifier in the first service identifier set; and sending, by the database network element, the network data eigenvalue list corresponding to each service identifier in the first service identifier set to the user plane network element.

7. The communication method according to claim 6, wherein the third information further comprises at least one of the following information: a time at which the user plane network element receives service transmission data corresponding to the first session, a session identifier of the first session, an identifier of a terminal corresponding to the first session, an internet protocol (IP) address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

8. The communication method according to claim 1, further comprising:
receiving, by the control plane network element, the first information from the database network element;
querying, by the control plane network element, the first information based on a DNN corresponding to a first session, to obtain second information, wherein the second information comprises a second feature index list set corresponding to the DNN corresponding to the first session and a service identifier corresponding to each feature index list in the second feature index list set; and
sending, by the control plane network element, the second information to a user plane network element.

9. The communication method according to claim 8, wherein the querying, by the control plane network element, the first information based on a DNN corresponding to a first session, to obtain second information comprises:
querying, by the control plane network element, the first information based on the DNN corresponding to the first session and at least one of a network slice type, an SSC mode, and a PDU session type that correspond to the first session, to obtain the second information.

10. The communication method according to claim 1, further comprising:
sending, by a control plane network element, a DNN corresponding to a first session to the database network element;
receiving, by the control plane network element, second information from the database network element, wherein the second information comprises a second feature index list set and a service identifier corresponding to each feature index list in the second feature index list set, and the service identifier corresponds to the DNN; and
sending, by the control plane network element, the second information to a user plane network element.

11. The communication method according to claim 10, wherein before the receiving, by the control plane network element, second information from the database network element, the communication method further comprises:
sending, by the control plane network element to the database network element, at least one of the following information corresponding to the first session: a network slice type, a session and service continuity SSC mode, and a packet data unit PDU session type.

12. The communication method according to claim 1, further comprising:
receiving, by a user plane network element, second information from a control plane network element, wherein the second information comprises a second feature index list set and a service identifier corresponding to each feature index list in the second feature index list set;

receiving, by the user plane network element, service transmission data corresponding to a first session;

determining, by the user plane network element, a service identifier corresponding to a feature index list that is in the second feature index list set and for which an eigenvalue cannot be obtained based on the service transmission data, to obtain a first service identifier set;

sending, by the user plane network element, third information to a database network element, wherein the third information comprises the first service identifier set; and receiving, by the user plane network element from the database network element, a network data eigenvalue list corresponding to each service identifier in the first service identifier set.

13. The communication method according to claim 12, wherein the third information further comprises at least one of the following information: a time at which the user plane network element receives the service transmission data corresponding to the first session, a session identifier of the first session, an identifier of a terminal corresponding to the first session, an internet protocol IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

14. A database network element, comprising:
a processor, configured to obtain training data, wherein the training data comprises service transmission data and network data;
a transmitter, configured to send the training data to a data analytics network element; and
a receiver, configured to receive first information from the data analytics network element, wherein the first information comprises a first feature index list set, a service identifier corresponding to each feature index list in the first feature index list set, and a data network name (DNN) corresponding to the service identifier.

15. The database network element according to claim 14, wherein the transmitter is further configured to: send the first information to a control plane network element.

16. The database network element according to claim 14, wherein the receiver is further configured to receive, from a control plane network element, a DNN corresponding to a first session;
wherein the processor is further configured to query the first information based on the DNN corresponding to the first session, to obtain second information, wherein the second information comprises a second feature index list set corresponding to the DNN corresponding to the first session and a service identifier corresponding to each feature index list in the second feature index list set; and wherein the transmitter is further configured to send the second information to the control plane network element.

17. The database network element according to claim 16, wherein the receiver is further configured to receive, from the control plane network element, at least one of the following information corresponding to the first session: a network slice type, an SSC mode, and a PDU session type; and wherein the processor is specifically configured to query the first information based on the DNN corresponding to the first session and the at least one of the information corresponding to the first session, to obtain the second information.

18. The database network element according to claim 14, wherein the receiver is further configured to receive third information from a user plane network element, wherein the third information comprises a first service identifier set;
wherein the processor is further configured to query the first information to obtain a feature index list corresponding to each service identifier in the first service identifier set;
wherein the processor is further configured to query the network data based on the feature index list corresponding to each service identifier in the first service identifier set, to obtain a network data eigenvalue list corresponding to each service identifier in the first service identifier set; and
wherein the transmitter is further configured to send the network data eigenvalue list corresponding to each service identifier in the first service identifier set to the user plane network element.

19. The database network element according to claim 18, wherein the third information further comprises at least one of the following information: a time at which the user plane network element receives service transmission data corresponding to the first session, a session identifier of the first session, an identifier of a terminal corresponding to the first session, an internet protocol IP address of the terminal corresponding to the first session, a port on the terminal corresponding to the first session, an IP address of a service server corresponding to the first session, a port that is on the service server and that corresponds to the first session, and a service transmission protocol for the service transmission data corresponding to the first session.

20. A data analytics network element, comprising:
a receiver, configured to receive training data from a database network element, wherein the training data comprises service transmission data and network data;
a processor, configured to determine first information based on the training data, wherein the first information comprises a first feature index list set, a service identifier corresponding to each feature index list in the first feature index list set, and a data network name (DNN) corresponding to the service identifier; and
a transmitter configured to send the first information to the database network element.

* * * * *

UNITED STATES PATENT AND TRADEMARK OFFICE
CERTIFICATE OF CORRECTION

PATENT NO. : 11,451,286 B2
APPLICATION NO. : 16/824859
DATED : September 20, 2022
INVENTOR(S) : Yan Li et al.

Page 1 of 1

It is certified that error appears in the above-identified patent and that said Letters Patent is hereby corrected as shown below:

On the Title Page

In item (56), in Column 2, under "Other Publications", Line 2, delete "52-173192," and insert -- S2-173192, --.

In the Claims

In Column 46, Line 62, in Claim 11, delete "SSC" and insert -- (SSC) --.

In Column 46, Line 63, in Claim 11, delete "PDU" and insert -- (PDU) --.

In Column 47, Line 26, in Claim 13, delete "IP" and insert -- (IP) --.

In Column 48, Line 40, in Claim 19, delete "IP" and insert -- (IP) --.

Signed and Sealed this
First Day of November, 2022

Katherine Kelly Vidal
*Director of the United States Patent and Trademark Office*